(12) United States Patent
Watanabe et al.

(10) Patent No.: US 12,146,395 B2
(45) Date of Patent: Nov. 19, 2024

(54) STREAMLINE BASED CREATION OF COMPLETION DESIGN

(71) Applicant: Schlumberger Technology Corporation, Sugar Land, TX (US)

(72) Inventors: Shingo Watanabe, Houston, TX (US); Frode Bratvedt, Oslo (NO); Matthew Worthington, Houston, TX (US); Trevor Graham Tonkin, Abingdon (GB)

(73) Assignee: Schlumberger Technology Corporation, Sugar Land, AS (US)

( * ) Notice: Subject to any disclaimer, the term of this patent is extended or adjusted under 35 U.S.C. 154(b) by 568 days.

(21) Appl. No.: 17/595,601

(22) PCT Filed: May 28, 2019

(86) PCT No.: PCT/US2019/034188
§ 371 (c)(1),
(2) Date: Nov. 19, 2021

(87) PCT Pub. No.: WO2020/242455
PCT Pub. Date: Dec. 3, 2020

(65) Prior Publication Data
US 2022/0228466 A1 Jul. 21, 2022

(51) Int. Cl.
*E21B 43/16* (2006.01)
*G06F 30/28* (2020.01)
*G06F 113/08* (2020.01)

(52) U.S. Cl.
CPC .......... *E21B 43/16* (2013.01); *E21B 2200/20* (2020.05); *G06F 30/28* (2020.01); *G06F 2113/08* (2020.01)

(58) Field of Classification Search
CPC ...... E21B 43/16; E21B 2200/20; E21B 43/12; E21B 43/25; E21B 41/00; E21B 43/14;
(Continued)

(56) References Cited

U.S. PATENT DOCUMENTS

| 10,450,825 B2 | 10/2019 | Blekhman et al. |
| 11,326,443 B2 | 5/2022 | Watanabe et al. |

(Continued)

FOREIGN PATENT DOCUMENTS

WO 2005120195 A2 12/2005

OTHER PUBLICATIONS

Samier, P. ea, L. Quettier, and M. Thiele. "Applications of streamline simulations to reservoir studies." SPE Reservoir Simulation Conference?. SPE, 2001. (Year: 2001).*

(Continued)

*Primary Examiner* — Michael Edward Cocchi
(74) *Attorney, Agent, or Firm* — Jeffrey D. Frantz

(57) ABSTRACT

Using a reservoir simulator, a reservoir model state is obtained. The reservoir model state is used to trace streamlines to obtain streamline trajectories and detect fluid fronts along the streamlines. Using the streamline trajectories, the streamlines are connected to wells. The streamlines are grouped for multiple granularity levels, into groups to obtain a grouping hierarchy. Through the granularity levels of the grouping hierarchy, fluid front time of flights are determined for the groups, and target flowrates assigned to completion devices based on the fluid front time of flights to obtain target flow rates. A completion design is presented that incorporates the target flowrates.

20 Claims, 13 Drawing Sheets

Conceptual Diagram with Injection Rate Fixed and Production Rate Controlled

(58) Field of Classification Search
CPC ...... E21B 47/00; G06F 30/28; G06F 2113/08; G06F 2111/10; G06F 30/25; G06F 30/23; G06F 30/20; G06F 30/27; G01V 2210/66; G01V 20/00; G05B 13/041
See application file for complete search history.

(56) References Cited

U.S. PATENT DOCUMENTS

| | | |
|---|---|---|
| 2011/0290479 A1 | 12/2011 | Izgec et al. |
| 2012/0191432 A1 | 7/2012 | Khataniar et al. |
| 2015/0039276 A1 | 2/2015 | Maucec |
| 2015/0120255 A1 | 4/2015 | King et al. |
| 2016/0319627 A1 | 11/2016 | Blekhman et al. |
| 2020/0102819 A1 | 4/2020 | Watanabe et al. |

OTHER PUBLICATIONS

Tang, Guo-qing, and A. R. Kovscek. "Experimental study of heavy oil production from diatomite by water imbibition at elevated temperatures." SPE Improved Oil Recovery Conference?. SPE, 2002. (Year: 2002).*

Park, Han-Young. A Hierarchical Multiscale Approach to History Matching and Optimization for Reservoir Management in Mature Fields. Diss. Texas A & M University, 2012. (Year: 2012).*

Watanabe, Shingo, et al. "Streamline-based time-lapse-seismic-data integration incorporating pressure and saturation effects." SPE Journal 22.04 (2017): 1261-1279. (Year: 2017).*

International Search Report and Written Opinion for the equivalent PCT/US2019/034188 issued Jul. 24, 2019 (11 pages).

Thiele. M. R: "Streamline Simulation", 6th International Forum on Reservoir Simulation, Sep. 3-7, 2001, Schloss Fuschl, Austria, p. 1-24.

International Preliminary Report on Patentability for the equivalent PCT/US2019/034188 issued Dec. 9, 2021 (8 pages).

Yu et al., "Hierarchial Streamline Bundles", IEEE Transactions on Visualization and Computer Graphics, 2012, 8(8), 15 pages.

* cited by examiner

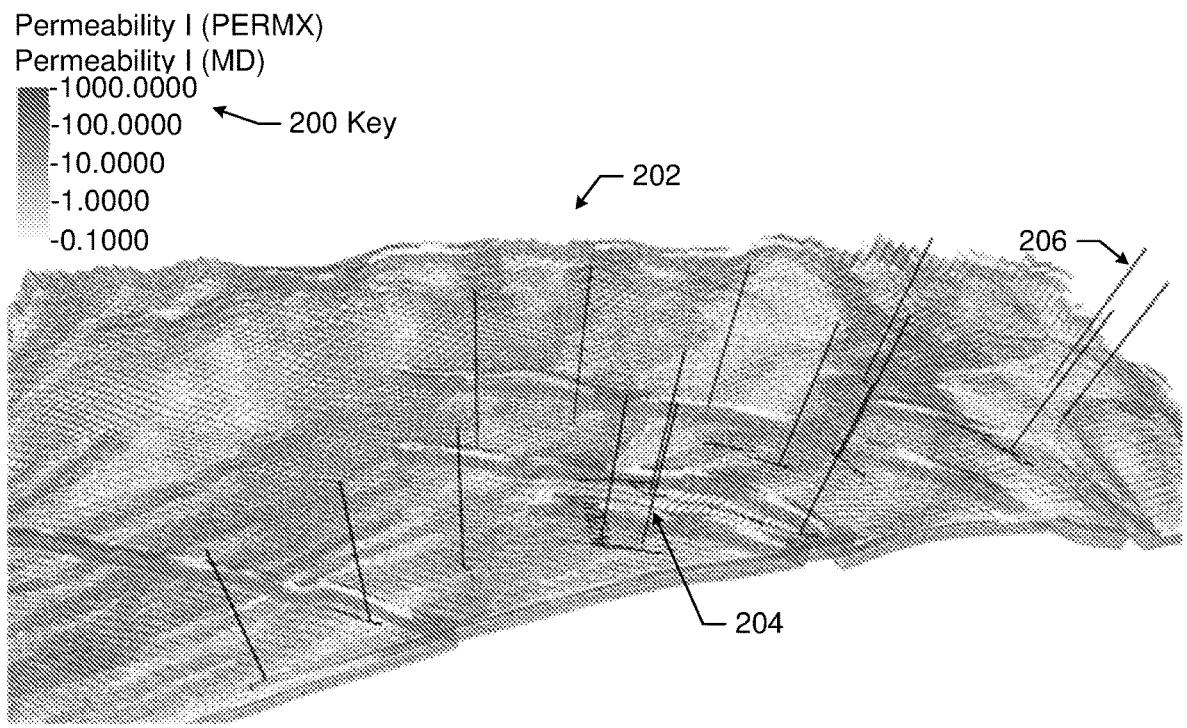
*FIG. 2.1*
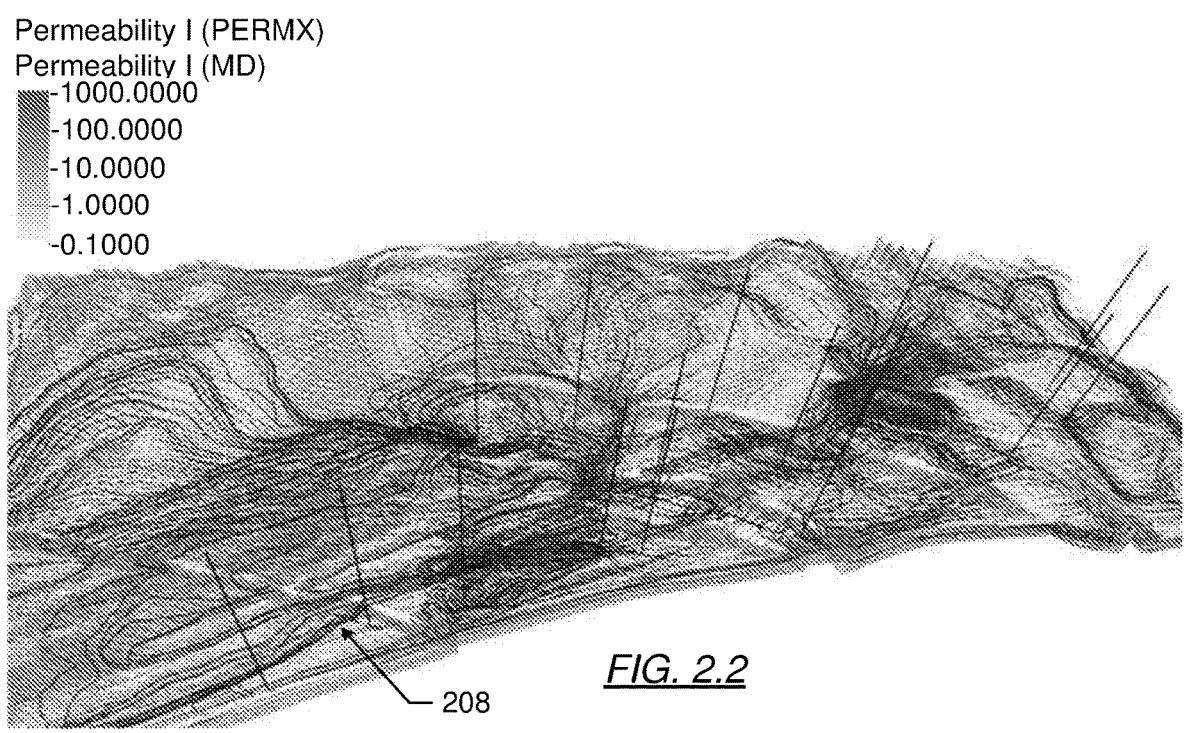
*FIG. 2.2*

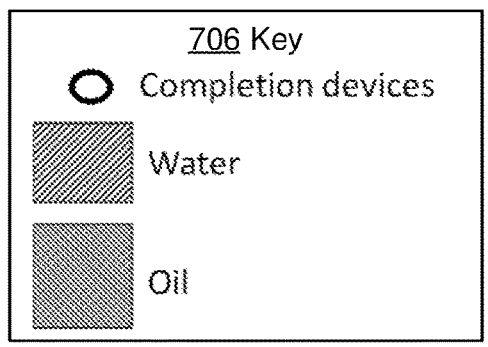
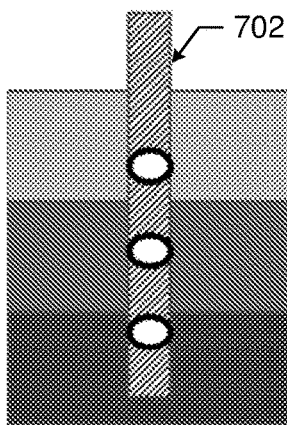
FIG. 7.1
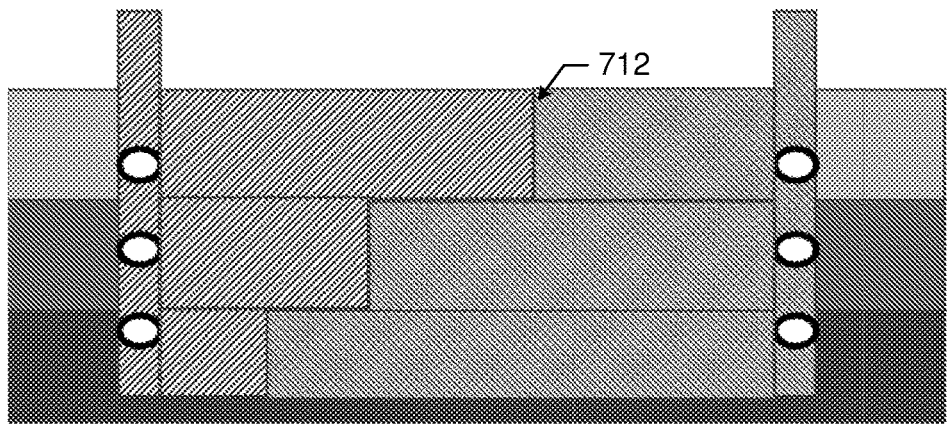
FIG. 7.2

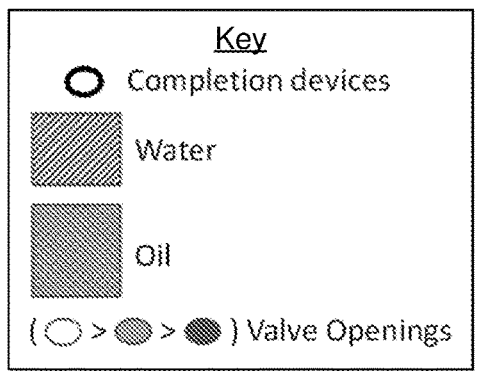
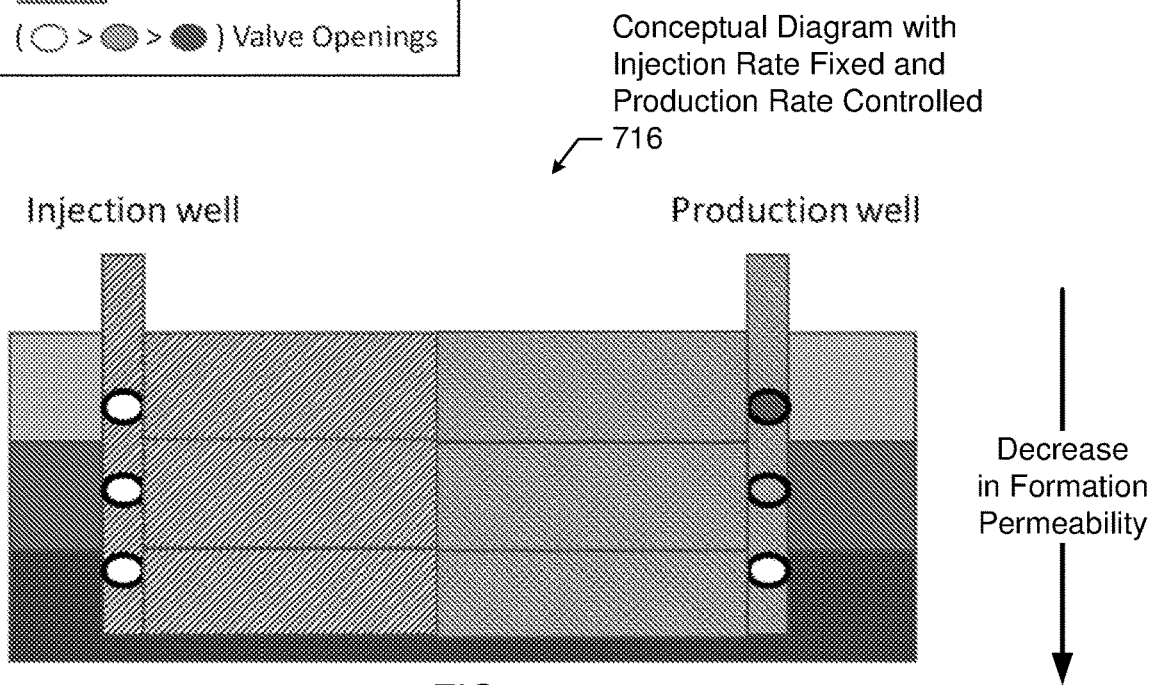
FIG. 7.3
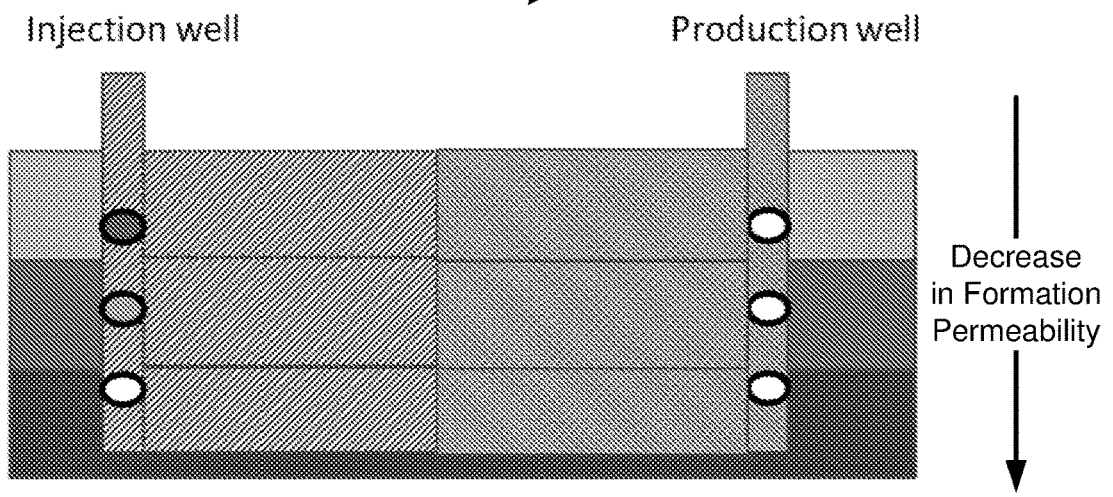
FIG. 7.4

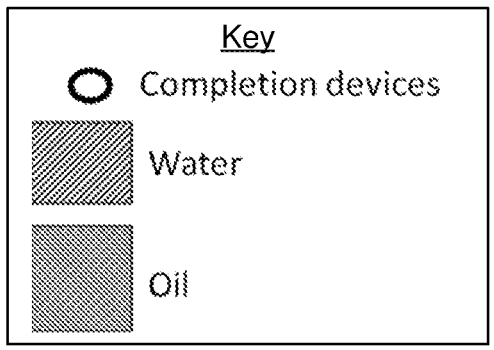
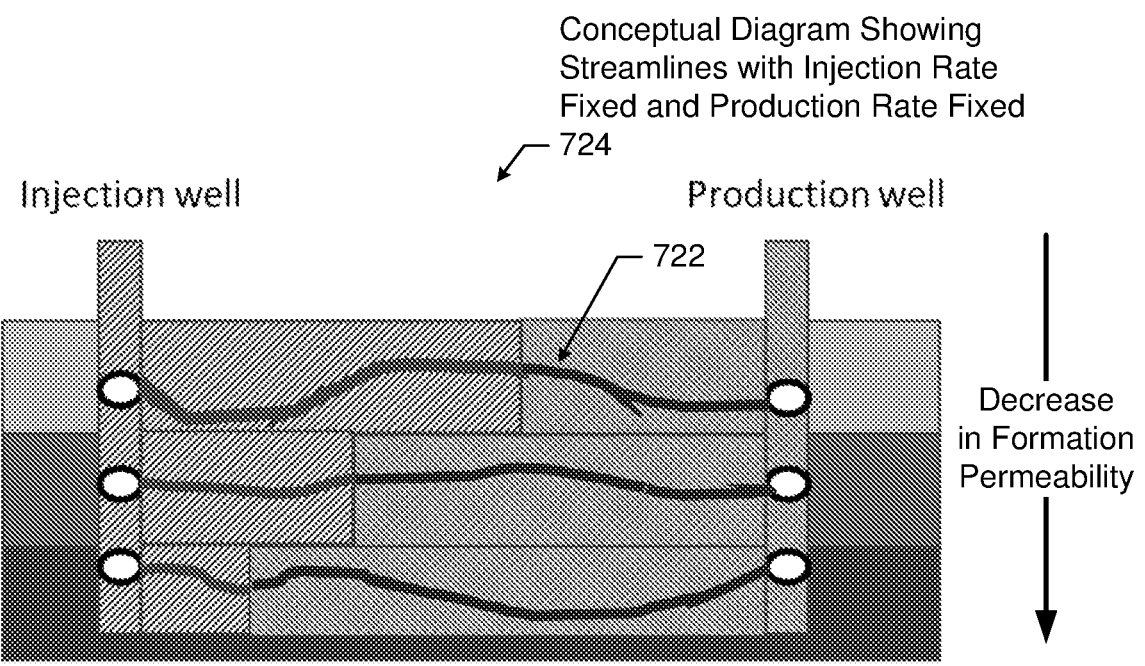
FIG. 7.5

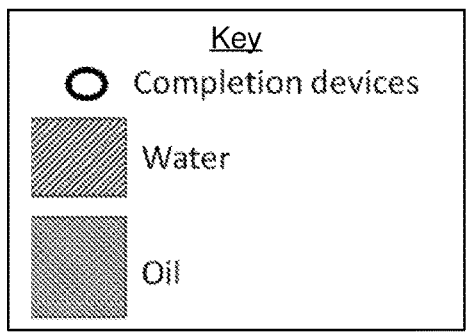
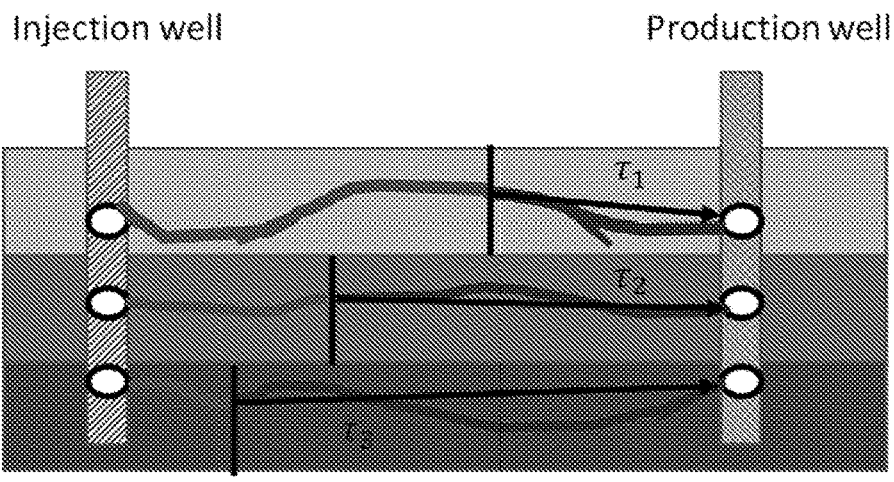
FIG. 7.6
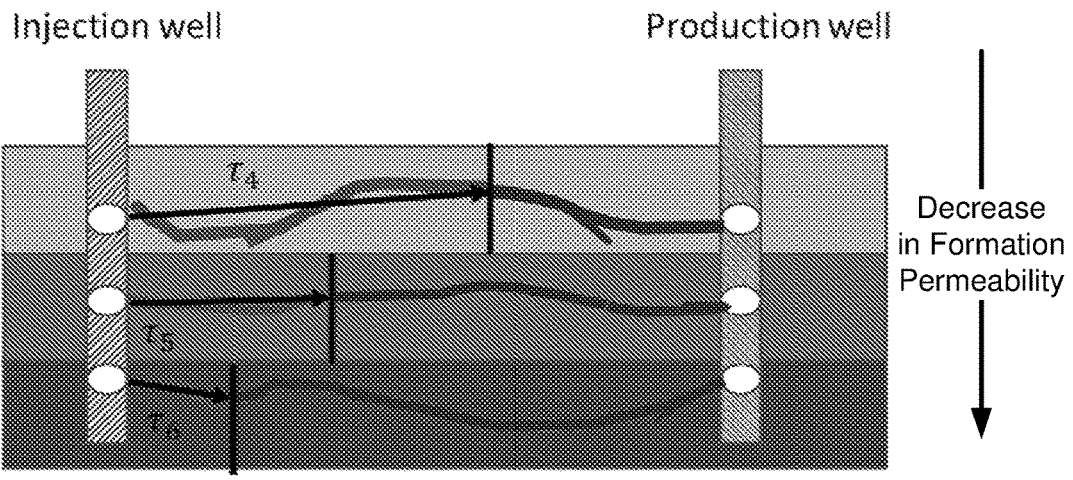
FIG. 7.7

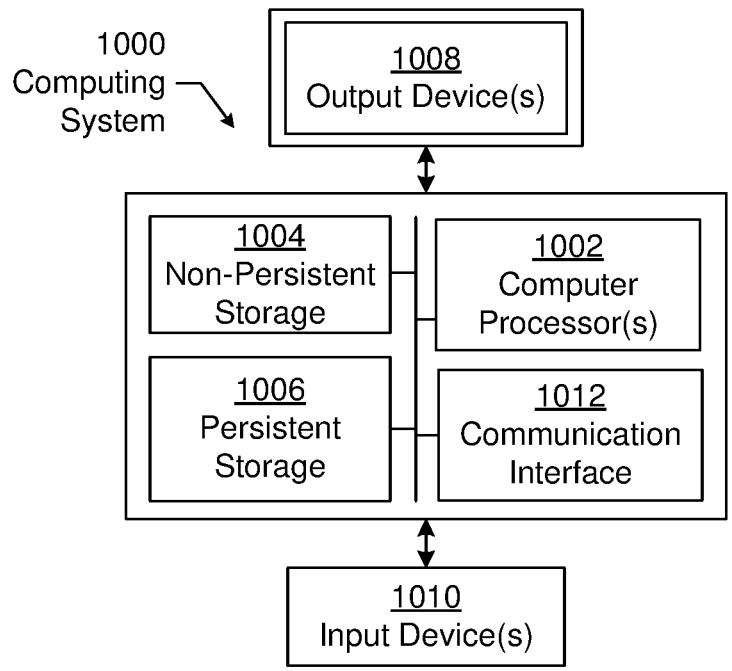
*FIG. 10.1*
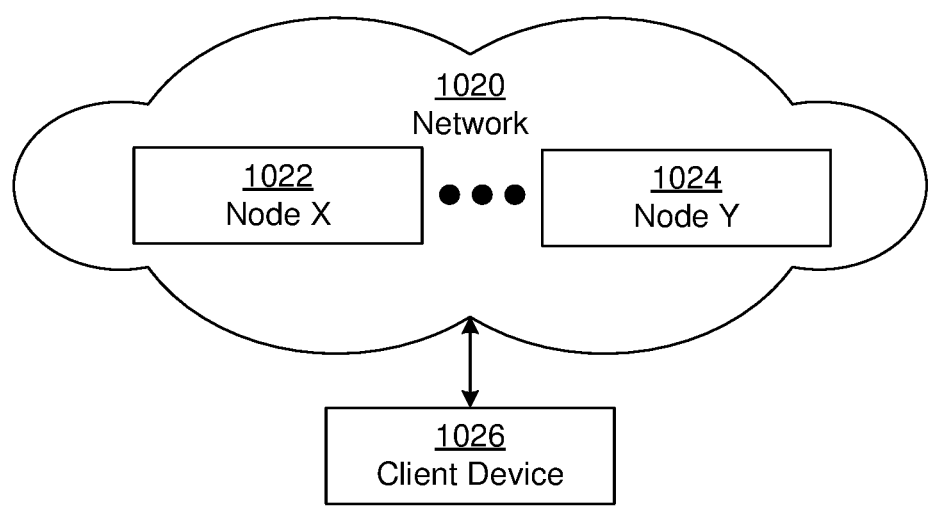
*FIG. 10.2*

STREAMLINE BASED CREATION OF COMPLETION DESIGN

BACKGROUND

Computer systems are used for a variety of technological fields in order to model various aspects of a technology. For example, one use of computer systems is to model underground formations and model the extraction of hydrocarbons. Specifically, sensors at the oilfield gather large volumes of data. The sensors send the large volumes of data to the computer system. Through the various techniques of mathematical modeling and simulations, the computer system attempts to create an optimal design for extracting hydrocarbons. A challenge exists to manage the amount of data that the computer system receives, the execution times, and the various timing requirements for returning a result. Often, the computer system is inefficient or inaccurate when performing the modeling and generating a result. Inefficiency causes delay or more computing resources to be used and inaccuracy causes the resulting design to be non-optimal.

SUMMARY

In general, in one aspect, one or more embodiments related to a method that includes obtaining, using a reservoir simulator, a reservoir model state, tracing streamlines through the reservoir model state to obtain streamline trajectories, and detecting, using the reservoir model state, fluid fronts along the streamlines. The method further includes connecting, using the streamline trajectories, the streamlines to wells, grouping, for multiple granularity levels, the streamlines into groups to obtain a grouping hierarchy. The method further includes determining, through the granularity levels of the grouping hierarchy, fluid front time of flights for the groups, and assigning target flowrates to completion devices based on the fluid front time of flights to obtain target flow rates. A completion design is presented that incorporates the target flowrates.

Other aspects of the technology will be apparent from the following description and the appended claims.

BRIEF DESCRIPTION OF DRAWINGS

FIGS. 2.1 and 2.2 show diagrams of a multiple well system in accordance with one or more embodiments.

FIGS. 7.1, 7.2, 7.3, 7.4, 7.5, 7.6, and 7.7 show example diagrams in accordance with one or more embodiments.

FIGS. 10.1 and 10.2 show a computing system in accordance with one or more embodiments.

DETAILED DESCRIPTION

Figure 1:
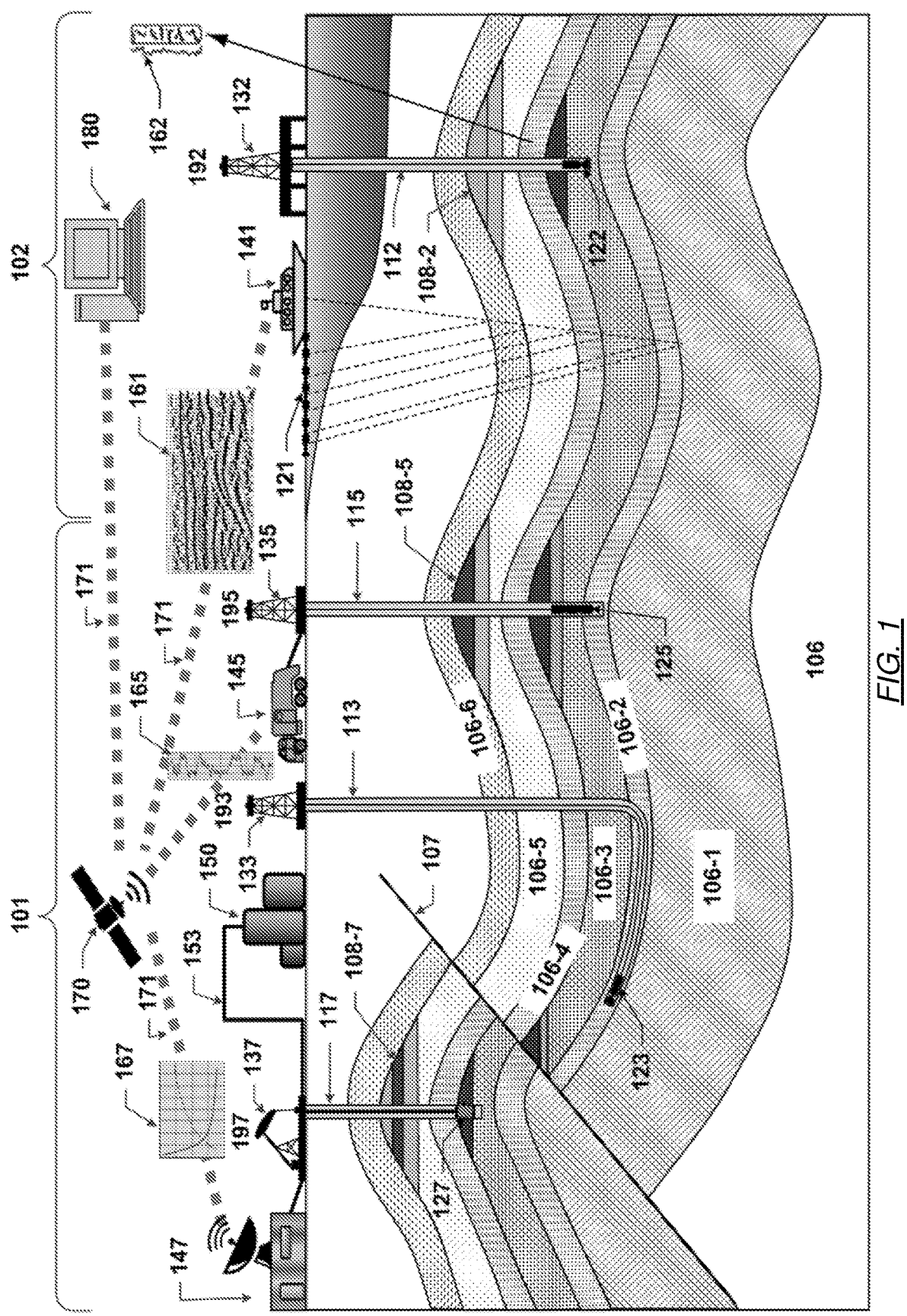
FIG. 1 depicts a schematic view, partially in cross section, of an onshore field and an offshore field in which one or more embodiments may be implemented.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed to improving the accuracy and efficiency of a computer system when generating a completion design having completion device settings for both a single well and multiple well systems. One or more embodiments use a reservoir simulator to identify a reservoir model state for a time period. Rather than performing several computationally expensive reservoir simulations to iterate through each possible combination of completion device settings, one or more embodiments use a proxy model based on the reservoir model state. The proxy model is a streamline-based model that identifies front time of flights for a group hierarchy of streamlines and assigns device settings to achieve a production objective.

FIG. 1 depicts a schematic view, partially in cross section, of an onshore field (101) and an offshore field (102) in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) includes a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an exploration and production (E&P) computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) through the fluids transport pipeline (153).

In one or more embodiments, the surface units (141), (145), and (147), are operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. In one or more embodiments, the surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

In one or more embodiments, the surface units (141), (145), and (147) are communicatively coupled to the E&P computer system (180) via the communication links (171). In one or more embodiments, the communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. In one or more embodiments, the E&P computer system (180) is provided with functionality for manipulating and analyzing the data, such as analyzing seismic data to determine locations of hydrocarbons in the geologic sedimentary basin (106) or performing simulation, planning, and optimization of exploration and production operations of the wellsite system. In one or more embodiments, the results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined. The E&P computer system and/or surface unit may correspond to a computing system, such as the computing system shown in FIGS. 10.1 and 10.2 and described below.

FIGS. 2.1 and 2.2. shows an example reservoir permeability model of a multiple well system in accordance with one or more embodiments. Specifically, FIG. 2.1 shows a diagram of a reservoir permeability model (202) having a reservoir. As shown by key (200) and variation in greyscale color of the model, the subsurface formation has varying permeability though out. Because direct measurement of each location of the subsurface formation is not possible, extrapolation and interpolation may be performed based on sensor measurements acquired using various devices described above with reference to FIG. 1.

In FIG. 2.1, the black vertical lines (e.g., vertical line (204), vertical line (206)) represents a well. The well may have horizontal segments extending from the vertical portion. Some of the wells may be injection wells and some of the wells may be production wells. A production well is a well from which hydrocarbons are obtained. In other words, hydrocarbons flow out of the production well. An injection well is a well in which injection fluid is injected into the subsurface formation. The injection fluid changes the pressure gradients of the reservoir causing hydrocarbons to be produced in the production well. Streamlines may connect a reservoir to the production well and may connect an injection well to a production well.

FIG. 2.2 shows the reservoir permeability model (202) of FIG. 2.1 with streamlines added. The wells and subsurface formations of FIG. 2.1 are the same as shown in FIG. 2.2. The additional black and grey lines in FIG. 2.2 that are not shown in FIG. 2.1 correspond to streamlines (e.g., streamline (208)). Streamlines are paths along which fluid may flow. More specifically, a streamline is a trajectory of a particle in a velocity/flux field. In particular, a streamline refers to a path that a particle would take through a three-dimensional space (e.g., reservoir) for a pressure solution at a given time. In the reservoir simulation, the streamline is defined as a computational flow line tangent to the reservoir model numerical velocity field. Thus, the streamlines start in various locations in the reservoir or injection well and end at the one or more wellbores. Under consistent production/injection levels, streamline geometry changes as the velocity field varies dynamically with field operations. The changes of the streamline geometry are much slower than the movement of the fluid fronts along the streamlines. A streamline geometry may also change based on the completion device parameters along the wells. A streamline is not a physical property of the subsurface formation, such as a fracture, but rather is a modeled property of the subsurface formation. In particular, the three-dimensional domain of the reservoir is decomposed into many one-dimensional streamlines, and fluid flow calculations are performed along each streamline.

Figure 3:
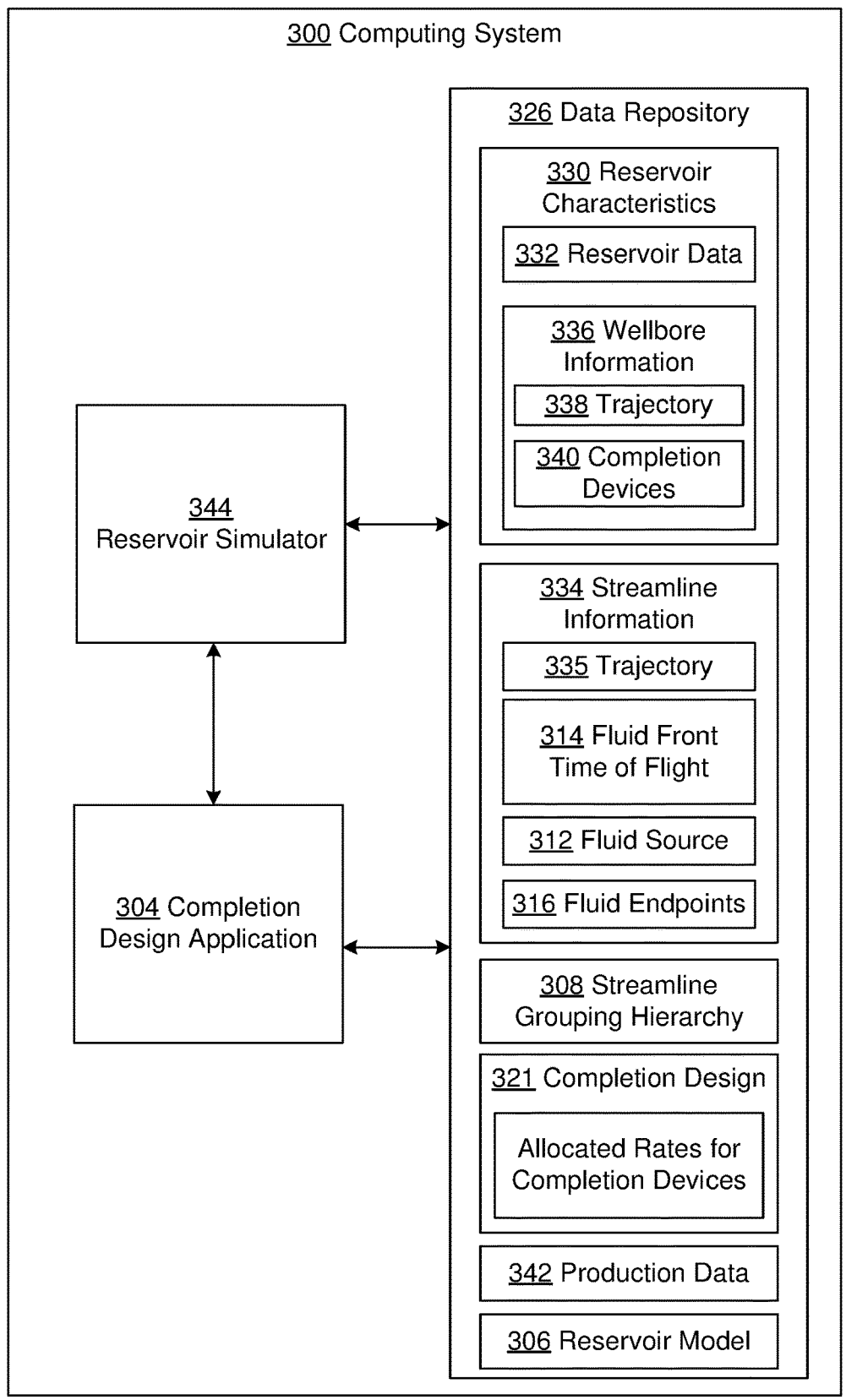
FIG. 3 shows a computer system in accordance with one or more embodiments.

FIG. 3 shows a computing system (300), which may be the same as computing system (180) in FIG. 1. The hardware components of computing system (300) is described in further detail below and in FIGS. 10.1 and 10.2. The computing system includes a completion design application (304) and a data repository (326).

In one or more embodiments of the technology, the data repository (326) is any type of storage unit and/or device (e.g., a file system, database, collection of tables, physical memory, or any other storage mechanism) for storing data. The storage of data may be permanent, semi-permanent, or temporary (e.g., during execution of the completion design application (304)). Further, the data repository (326) may include multiple different storage units and/or devices. The multiple different storage units and/or devices may or may not be of the same type or located at the same physical site.

The data repository (326) includes functionality to store reservoir characteristics (330). The reservoir characteristics (330) is information about the subsurface formations from which hydrocarbons may be produced. The reservoir characteristics (330) may further include information about the wellbore. The reservoir characteristics (330) may be input for the reservoir model (306), discussed below. Reservoir characteristics (330) includes reservoir data (332) and wellbore information (336) for one or more wells.

Reservoir data (332) is information about the subsurface formation. For example, the reservoir data (332) may include information about the physical properties of the subsurface formations, such as porosity, permeability, gamma ray logs, pressures etc. that is gathered from the seismic and other sensors described above with reference to FIG. 1.

Wellbore information (336) is information describing the wellbore, such as the wellbore in FIG. 1. For example, wellbore information may include information about the geometry (e.g., shape) and trajectory (e.g., path) (338) of the wellbore. One or more embodiments may be applied to a single lateral, multi-lateral, or multi-well configuration. Wellbore information (336) may also include information about the upstream devices connected to the wellbore for completion operations. Wellbore information (336) may also include information about completion devices (340) in the well. Specifically, completion devices (340) are physical devices located along the wellbore of a well that directly or indirectly affect the flow of hydrocarbons in the same well or a different well. For example, one or more of the completion devices may be any type of flow control device. The flow control device may be an inline or annular flow control device, active or passive flow control device, and/or a manual or autonomous flow control device. An example of an active inflow control device is a MANARA® valve. MANARA® is a registered trademark of Schlumberger Technology Corporation located in Houston, TX.

Continuing with the data repository (326), the data repository (326) includes functionality to store streamline information (334). Streamline information (334) is information describing individual streamlines in the subsurface formation.

In one or more embodiments, streamline information (334) includes the trajectory (335), the fluid endpoints (316), fluid front time of flight (314), and fluid source (312). The streamline information (334) may also include other information about the streamline, such as pressure and flowrate. For example, the flowrate may differ between streamlines. The trajectory (335) is the path of the streamline through the reservoir model (306) (described below). The fluid endpoints (316) are the start and end of the streamline. The streamline starts at a source and ends at a sink. In one or more embodiments, the source is the injector well and the sink would be the producer well. As another example, the source may be a water aquifer or gas cap. Initially, a fluid front may be at a same position as the source, which is the starting endpoint for the streamline. Thus, initially, in some embodiments, the endpoints may include one fluid endpoint of a well (e.g., along the trajectory of the well) and another fluid endpoint may be the starting location of a fluid front (i.e., fluid front location).

Over time, the fluid front moves along the streamline. A fluid front is the location in which the particles flowing along the streamline or wellbore changes from one composition to another composition. For example, the fluid front may be a water/gas front whereby the particles change from gas particles to water particles or from water particles to gas particles. In other words, the primary composition of the particles flowing changes from water to gas or from gas to water. A fluid front that is a water front along streamline is formed from a water aquifer or water injection well source. A fluid front that is a gas front along streamline is formed from gas cap or gas injection well source.

The fluid source (312) defines the fluid type attributed to the streamline. In other words, the fluid source is the composition of fluids at the starting endpoint of the streamline. In one or more embodiments, the fluid source may be one of a discrete number of categories of fluid types. Specifically, a limited number of categories of fluid type may exist, where each category has a particular fluid type composition. A fluid source is defined as being in one of the categories based on the category most closely matched by the fluid source as compared to other categories. For example, if the categories are water sourced or gas sourced, then streamlines having more water than gas at the starting endpoint are water sourced (i.e., fluid source is water source) and streamlines having more gas than water at the starting endpoint are gas sourced (i.e., fluid source is gas source).

Continuing with FIG. 3, the fluid front time of flight (314) is the duration of time at which the fluid front travels from the starting endpoint (316) to an ending location. The ending location may be the wellbore (e.g., a grid cell on the wellbore) or a location along the wellbore. The location of the fluid front moves during production as hydrocarbons are produced. The fluid front time of flight (314) may be defined in any of various units (e.g., seconds/minutes/hours, timesteps, etc.) without departing from the scope of the claims. Rather than duration of time, the arrival time of the fluid front may be used without departing from the scope of the claims.

Continuing with the data repository (326), the data repository (326) includes functionality to store a streamline grouping hierarchy (308). The streamline grouping hierarchy is a hierarchy of groups of streamlines. Each level in the hierarchy is a granularity level of grouping streamlines in one or more embodiments. The most granular level in the hierarchy may be an individual streamline level having individual streamlines. The next and subsequent levels may be a streamline bundle, streamlines having an endpoint in a same grid cell, streamlines connected to a same completion device, streamlines connected to the same well, and streamlines in the same oilfield. At each level, streamlines are partitioned, such that a streamline is in a single partition. A group in the hierarchy is in a parent child relationship with another group with containment. In other words, a parent group includes the streamlines in the one or more child groups of the parent group. The streamline grouping hierarchy (308) may store a unique identifier for each streamline in the group, an endpoint identifier, a group identifier, and/or other information A streamline bundle is a set of two or more streamlines that have a same endpoint at the object (e.g., wellbore). Streamline bundles may be further grouped based on being consecutive and have a same fluid front time of flight within a threshold degree of variability. For example, the streamlines in the streamline bundle may terminate at a same grid cell along the wellbore.

By grouping streamlines into streamline bundles, the fluid front time of flights of the streamlines may be grouped into a single value. For example, the single value may be an average value. Thus, rather than the computing system performing individual simulations on each streamline, the computing system may perform on the streamline bundle as a group. By treating a streamline bundle as a single group, the computing system more efficiently uses the computing system resources. Further, by grouping the streamlines into more groups of the hierarchy, rates may be allocated to groups efficiently.

Continuing with the data repository (326), the data repository (326) may also include functionality to store a completion design (321), production data (342), and a reservoir model (306).

A completion design (321) is a specification of the configuration of physical equipment in the oilfield to extract hydrocarbons. For example, the completion design (321) may specify the allocated rates for completion devices ( ). The allocated rates are the fluid flow rates allocated to the completion device to achieve a production objective. Namely, the allocated rates are the fluid flow rates that the completion device should allow through the completion device in order to satisfy the production objective.

For example, one production objective may be to maximize sweep efficiency. During completion operations, achieving uniform fluid front arrival time may be deemed optimal. Because the streamlines have varying volumes of fluid and different locations of fluid fronts, streamlines may have different fluid front arrival times. Sweep efficiency is having uniform fluid front arrival times at the production equipment, production storage tanks, and other production components located at the surface. Sweep efficiency may be an effectiveness measure of an enhanced oil recovery process that depends on the volume of the reservoir contacted by the injected fluid. Sweep efficiency may also be hydrocarbon recovery efficiency by primary depletion without injection wells or water and/or gas injection wells.

Another production objective may be to minimize an amount of injected fluids while producing a maximum amount of hydrocarbons. Other production objectives or combinations of objectives may exist.

Production data (342) is information about the volume, composition, velocity, and other aspects of the hydrocarbons produced from the wellbore. In one or more embodiments, the production data (342) is dependent on the completion design.

A reservoir model (306) is a model of an oilfield reservoir. In one or more embodiments, the reservoir model (306) is defined as a grid spanning a subsurface region. The grid may be a regular grid or irregular grid. Each location in the grid is a grid cell. The size of the grid cell is the scale at which the reservoir model models the subsurface formations with the reservoir. Each grid cell has physical properties defined for the grid cell. For example, the physical properties may be porosity, permeability, composition, pressure gradients, or other properties. The reservoir model may further include information about fluid flow through the reservoir. The physical properties may be obtain using the oilfield equipment described above with reference to FIG. 1.

The reservoir model may have one or more reservoir model states. A reservoir model state is the state of the reservoir model for a particular period of time. Specifically, the reservoir model state is the one or more sets of physical property values assigned to grid cells for the particular period of time. The reservoir model state may be a snapshot, such as by having a single value for each property and each grid cell) or may be include changes over the time period, such as including a collection of values that span the period.

Continuing with FIG. 2, a completion design application (304) is communicatively connected to the data repository (326). For example, the completion design application (304) includes functionality to read, write, and store data in the data repository (326). The completion design application (304) includes functionality to generate a completion design (321) based on a reservoir model (306). For example, the completion design application (304) may include functionality to use the reservoir characteristics and/or the reservoir model as input, identify streamlines, perform streamline grouping, determine time of flights, and calculate a completion design. The completion design application (304306) may include functionality to store data in the data repository (326) temporarily or at least semi permanently. For example, the data stored may be for use of the completion design application while generating the completion design (321).

The completion design application (304) may be connected to a reservoir simulator (344). The reservoir simulator (344) includes functionality to simulate the flow of fluids through the subsurface formations and the wellbores. Specifically, the reservoir simulator (344) includes functionality to determine the amount of flow, composition, pressure, of fluids through the various rock formations and wellbore using the reservoir model (306). The reservoir simulator (344) may operate through various time periods, where each time period represents a period of actual time (e.g., hour, day, week, etc.). For example, the reservoir simulator (344) may be configured to predict values representing composition and amounts of fluid at each grid cell and location along the wellbore. Other outputs of the reservoir modeling tool may exist and be used.

Figure 4:
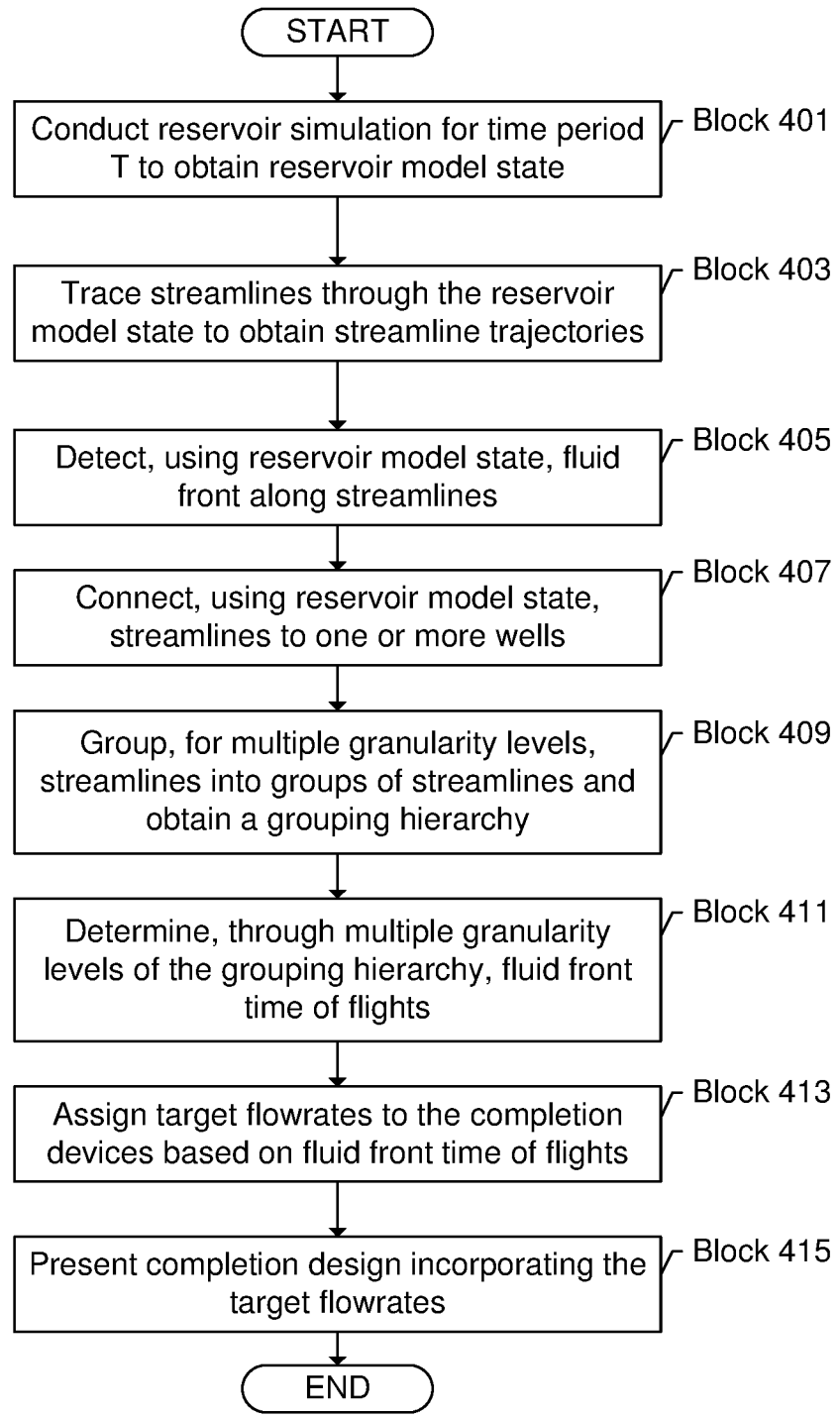
FIG. 4 shows a flowchart in accordance with one or more embodiments.
Figure 5:
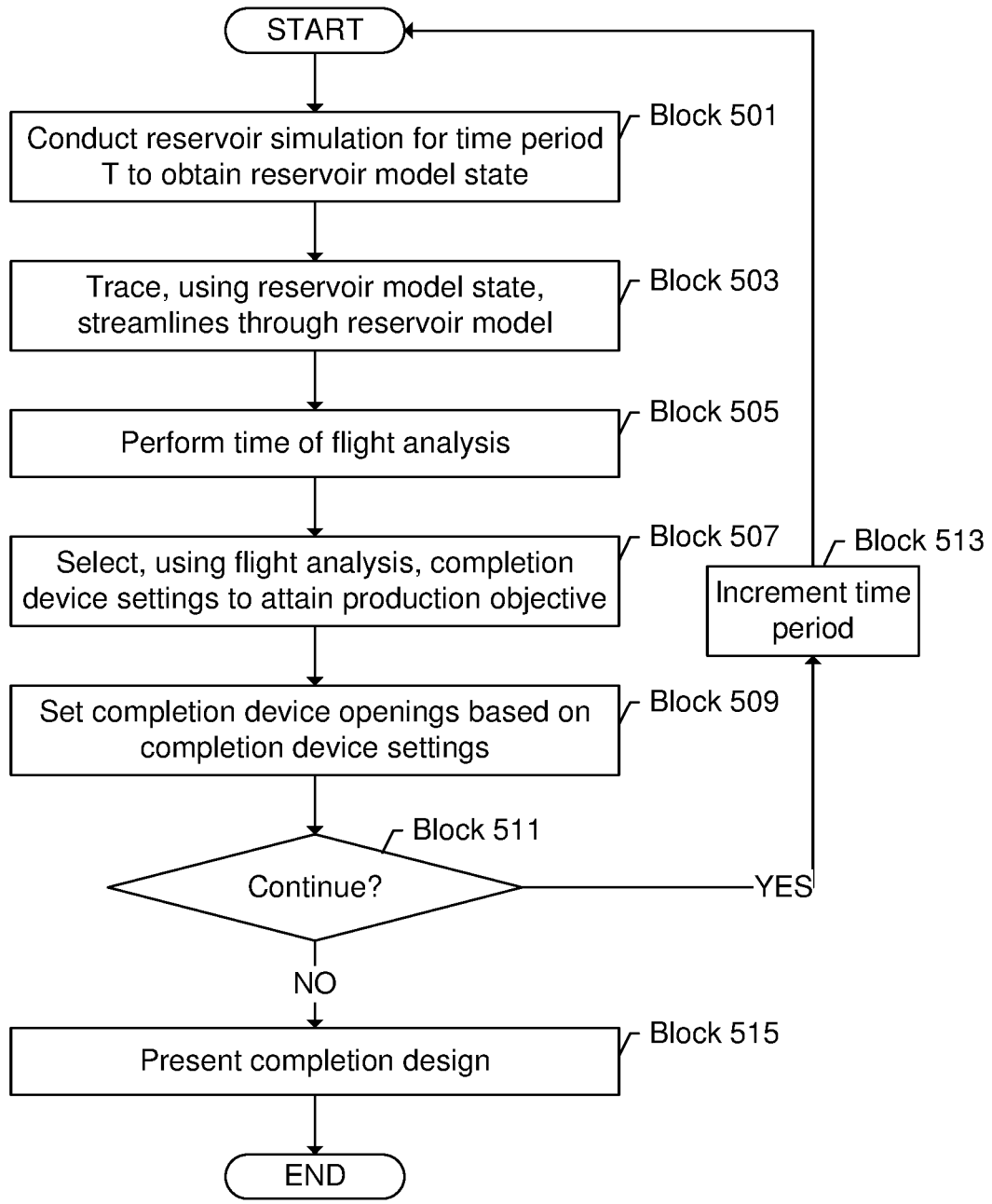
FIG. 5 shows a flowchart in accordance with one or more embodiments.
Figure 6:
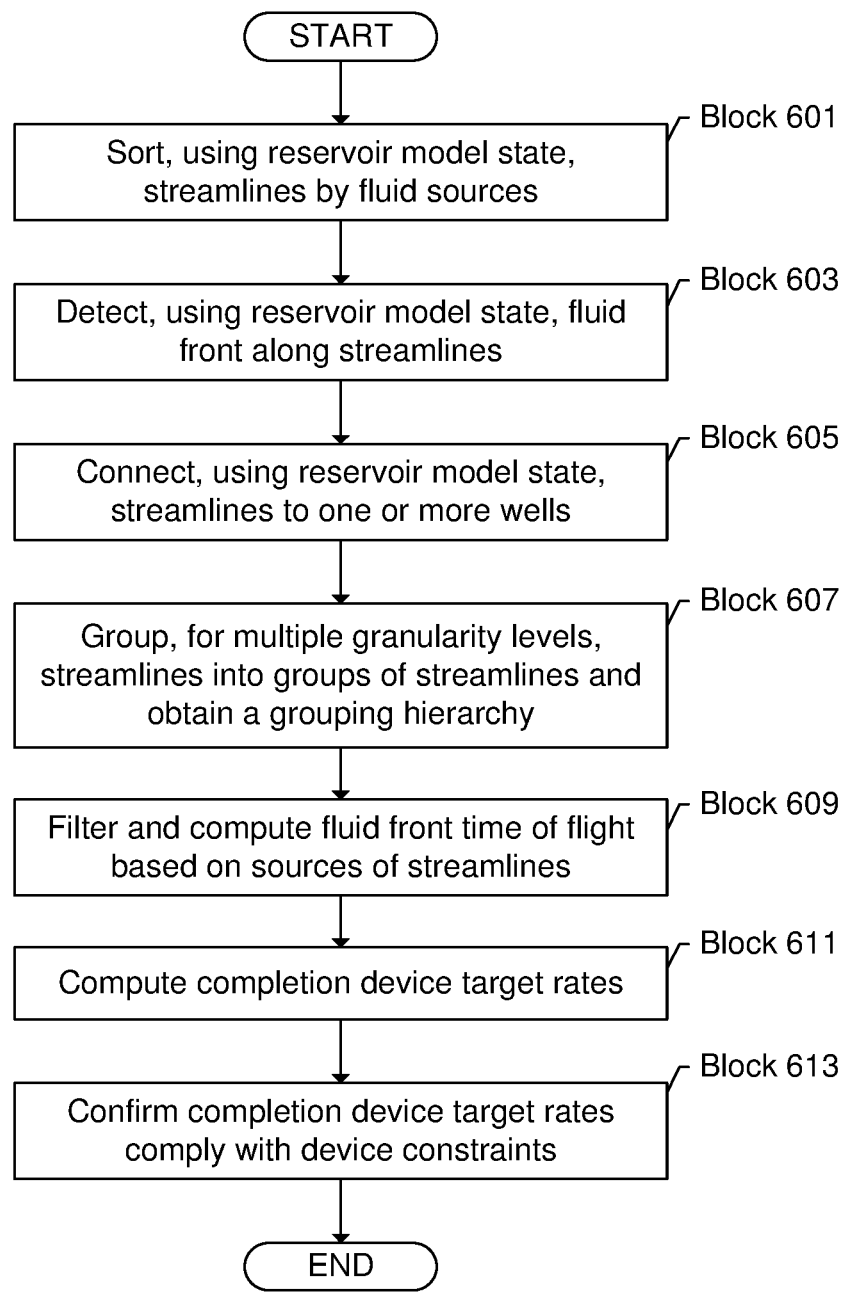
FIG. 6 shows a flowchart in accordance with one or more embodiments.

FIGS. 4, 5, and 6 show flowcharts in accordance with one or more embodiments. One or more blocks shown in FIGS. 4, 5, and 6 may be omitted, repeated, and/or performed in a different order among different embodiments. Accordingly, embodiments should not be considered limited to the specific number and arrangement of blocks shown in FIGS. 4, 5, and 6. In particular, FIG. 4 provides a general overview of one or more embodiments. FIGS. 5 and 6 are more detailed described at least one embodiment thereof. The blocks of FIGS. 4, 5, and 6 may be combined in the same embodiment, and all combinations are contemplated herein.

In Block 401, a reservoir simulation for time period T is performed to obtain a reservoir model state in accordance with one of more embodiments. An initial set of flowrates are assigned to the completion devices in the wells. The reactions to the set of flowrates and other parameters of production are simulated using the reservoir model during the simulated time period. The result is a reservoir model state that has values of physical properties of the reservoir including composition of fluids for the time period.

In Block 403, streamlines are traced through the reservoir model state to obtain streamline trajectories. Based on the reservoir model state, streamlines tracing may be performed. One or more embodiments use a streamline tracing algorithm that includes handling of aquifers and sampling of reservoir properties from the underlying model grid cells of the reservoir model. The paths of streamlines are determined from the properties of the grid cells.

In Block 405, using the reservoir model state, fluid front is detected along the streamlines. The reservoir properties are sampled onto the streamlines for identifying the water and gas fronts. In one or more embodiments, the composition of fluids along the paths of the streamlines are determined. Based on the composition of fluid along the paths, a determination may be made as to locations in which the composition changes. The locations of the change in composition correspond to fluid front.

In Block 407, using the reservoir model state, streamlines are connected to one or more wells. In one or more embodiments, connecting streamlines to wells includes comparing grid cell locations along the length of each well with grid cell locations along the streamlines. Where the grid cell location is the same (i.e., the streamline and the well intersect), the streamline is connected to the well. Various optimizations may be performed to reduce computational time, such as by partitioning the subsurface formation and into parts and comparing only streamlines and wells in the same parts.

In Block 409, for multiple granularity levels, streamlines are grouped into groups of streamlines to obtain a grouping hierarchy. In one or more embodiments, at the lowest level, streamline bundling is performed. Streamline bundling may account for fluid front time of flights of individual streamlines.

In one or more embodiments, each streamline includes a profile that specifies the starting fluid front location. For each streamline, a proxy model may be individually executed for the streamline to identify a fluid front time of flight to a defined location (e.g., location along the wellbore, completion point, etc.). The time of flight is the travel time of a particle along a streamline. For example, the time of flight may be the outcome from streamline tracing processing on the particle.

In one or more embodiments, streamlines may be grouped into streamline bundles according to termination location and the fluid front time of flight. The grouping of streamlines may be performed subsequent to streamline tracing for a streamline group. In one or more embodiments, streamlines that terminate into a same grid cell of the reservoir model are grouped into a single streamline bundle having a single fluid front time of flight. The fluid front time of flight is the fluid front time of flight at the grid cell. The grid cell may be a specific grid cell along the wellbore in the reservoir model. In one or more embodiments, the single fluid front time of flight associated with a streamline bundle may be an average, median or other value calculated from the fluid front time of flights of individual streamlines in the streamline bundle. Further bundling may be performed when consecutive streamlines have within a threshold degree, similar fluid front time of flights. In such a scenario, the entire streamline bundle may be assigned a single value to reduce computational time.

At a next level of the hierarchy, streamlines intersecting the adjacent grid cell along the well trajectory that differ only with respect to a single direction may be grouped. For example, if the grid cells are connected having adjacent grid cell location values for a single direction and the same grid cell location values for the other directions, the grid cells may be grouped.

Further, at a next level of the hierarchy, streamlines that connect to the same completion device are grouped. Each grouping at the completion device level of granularity includes groups of streamlines connected to the same grid cells at the grid cell level of granularity.

At a next level of the hierarchy, grid cells that connect to a same well are in a group. At the top level of the hierarchy, the oilfield may be in a group.

In Block 411, for multiple granularity levels of the grouping hierarchy, fluid front time of flights are determined. Starting with the most granular level grouping (i.e., the lowest level of the hierarchy), the following operations may be performed.

A cumulative rate value is calculated for each member streamline of the group of streamlines. The cumulative rate value is a measurement of the amount of fluid flow from a corresponding streamline per time interval (i.e., a rate of fluid flow). The total cumulative rate value is the sum of the cumulative rate values for the group that includes all members of the group. The total cumulative rate value is calculated for the group.

Further, member streamlines of the group are ordered from smallest to largest of the fluid front time of flights. Starting with the first streamline (i.e., initial streamline) in the order, the cumulative total rate is calculated as the sum of the prior cumulative total rate and the cumulative rate value of the current streamline. Thus, for the first streamline in the order, the cumulative total rate is zero added to the cumulative rate of the first streamline. For the next streamline that is in the second position in the order, the cumulative total rate is the cumulative rate values for the first and second streamlines of the order. The process is repeated until the cumulative total rate is a specified percentage of the total cumulative rate described above. When the cumulative total rate is equal to or exceeds the specified percentage, the time of flight of the corresponding streamline is set as the fastest fluid front time of flight for the group. For example, the specified percentile may be two percent. The corresponding streamline and streamlines after, according to the order, the corresponding streamline in which the specified percentage is met or exceeded are determined to be leading edge streamlines. Streamlines before, according to the order, the streamline in which the specified percentage is met or exceeded are determined to be trailing edge streamlines.

The process is repeated for the next level of the hierarchy using the fastest time of flight for the groups in the previous level of the hierarchy rather than individual streamlines. In other words, for a particular parent group, the child groups are ordered according to the fastest fluid front time of flight for the child groups. For each child group of the parent group, the cumulative rate value is the total cumulative rate value of the child group. The total cumulative rate value for the parent group is the sum of the cumulative rate values of the child group. Further, the child groups are ordered and the cumulative rate values are accumulated as described above to obtain a cumulative total rate value until the cumulative total rate value meets or exceed a specified percentage of the total cumulative rate value. The fastest fluid front time of flight of the corresponding child group is thus used as the fastest fluid front time of flight for the parent group. The process thus continues through each level of the hierarchy.

In Block 413, target flowrates are assigned to the completion devices based on the fluid front time of flights. The target flowrates are the allocated flowrates assigned to the completion devices. Across the groups, target rates are assigned in accordance with one or more embodiments. In one or more embodiments, the leading edge fluid front time of flights are the fluid front time of flights for each group obtained as described above in Block 411. Further, for each group, the trailing edge fluid front time of flights are determined as the average of the fluid front time of flights in the trailing edge streamlines. A uniform fluid front arrival time is calculated for each level of the hierarchy based on the leading edge and trailing edge average front time of flights.

Based on the leading edge, trailing edge, and reservoir flowrates, target rates are assigned to independent production zones to equalize fluid front arrival times across the independent production zones. In other words, the objective is to obtain a uniform fluid front arrival time that is uniform among the wells. Creating the uniform fluid front arrival time maximizes sweep efficiency. Thus, the target flowrates are assigned to obtain uniformity and maximize sweep efficiency. In one or more embodiments, a target flowrate is assigned to each group. In the hierarchy, the target flowrate for each child group is defined from the target flowrate for the parent group. Thus, while determining fluid front time of flight is bottom up (i.e., from highest granularity to lowest granularity), assigning target fluid flowrates is top down (i.e., from lowest granularity to device level granularity). In one or more embodiments, assigning target rates may be performed as discussed below with reference to equations, Eq. 1-11. Although the above is presented with respect to maximizing sweep efficiency, target rates may be assigned to achieve other production objectives without departing from the scope of the disclosure.

In Block 415, a completion design is presented that incorporates the target flowrates in accordance with one or more embodiments. At least some of the target flowrates are defined for completion devices. For example, after determining the target flowrate for the well, based on the target flowrate for the well, the target flow rate for each completion device along the well may be determined. Based on the target flow rates, settings for the completion devices are defined and presented as part of the completion design. For example, for flow control devices, choke parameters are defined that specify the settings for the flow control devices along the wellbore. The settings for a flow control device may account for flow from downstream flow control devices to the flow control device.

The completion design may be presented to another application, such as using an application programming interface, placed in storage, using a graphical user interface, or via another presentation technique. In one or more embodiments, the production configuration is presented to a user via a user interface in the surface unit depicted in FIG. 1 above. In one or more embodiments, production presented by sending to a software and/or hardware component of the exploration and production (E&P) computer system or wellsite systems depicted in FIG. 1 above.

A field operation may be performed in response to presenting the packer position and choking parameter. In one or more embodiments, the field operation is performed as described in reference to FIG. 1 above.

In one or more embodiments, the information obtained from the aforementioned data acquisition tools may include real time information during the field operation. Accordingly, the reservoir model may be adjusted based on the real time information. The method flow chart may be performed in response to adjusting the reservoir model based on the real time information during the field operation. One or more embodiments reduce the computing time and computing resources used in performing the method flow chart so as to eliminate or otherwise minimize delay of the field operation.

Additional examples include dynamic optimization of other types of flow control valves (e.g., ICV, Manara, etc.). Applied at discrete time intervals, embodiments allow re-allocating of the flow rate between various independent production zones in the same well/lateral or across different wells/laterals to account for the dynamic nature of streamline field, which was discounted in the static ICD optimization. This feature is particularly applicable when substantial changes in well rates or reservoir drive mechanism exist in the reservoir management scenario.

Turning now to FIGS. 5 and 6, FIGS. 5 and 6 show detailed diagram of one or more embodiments of FIG. 4. In Block 501, a reservoir simulation is conducted for time period T to obtain a reservoir model state. Reservoir simulation is advanced in time with the initial condition of reservoir and well control settings. For the initial completion device settings at the first time step of the simulation, total production rates are balanced equally in order define an initial set of settings for completion devices. The time period may be, for example, daily, weekly, monthly, quarterly, 6 monthly, and annually.

At Block 503, using the reservoir model state, streamlines are traced through the reservoir model. Based on the reservoir model state at the optimization time T, postprocessing of the reservoir flows at every connection of the reservoir model state in the current velocity field is performed.

Further, streamlines are traced sink/source points at producers/injectors respectively. In one or more embodiments, while tracing streamlines, the fractional flow values are computed and stored at the streamline nodes for the following time of flight (TOF) analysis step.

At Block 505, a time of flight analysis is performed. During the time of flight analysis, information from the traced streamlines is analyzed for the completion device optimization calculations. Performing the time of flight analysis is described below with reference to FIG. 6.

At Block 507, using the time of flight analysis, completion device settings are selected to attain production objective. Based on the calculated device target rates from the previous step, each device opening setting is optimized to meet the target rate as a constraint.

At Block 509, completion device openings are set based on the completion device settings. The completion device openings and settings are added to the completion design for the current time period T. At Block 511, a determination is made whether to continue. If a determination is made to continue, the flow proceeds to Block 513, to increment the time period. In such a scenario, Blocks 501-509 are repeated for the next time period. Specifically, simulation is advanced and the updated device settings from Block 509 are used as boundary conditions.

At Block 515, the completion design is presented. The result of repetitively performing the operations of FIG. 5 for multiple time periods is a collection of completion device settings that account for the change in rates and locations of streamlines over time. In particular, each completion device may have a set of one or more settings in the completion design for each time period. The set of settings may change over time per the completion design to account for the changing characteristics of the well and reservoir.

FIG. 6 shows a flowchart for performing time of flight analysis in accordance with one or more embodiments. In Block 601, streamlines are sorted using the reservoir model state by fluid sources. To identify the sources of streamlines for following analysis, the streamlines are sorted into categories based on the fluid source of the streamline. For example, streamlines may be sorted into water-sourced or gas-sourced based on the phase fractional flow values at the source point. If water fractional flow at the source point is larger than gas fractional flow, then this streamline is water-sourced. If the gas fractional flow at the source point is larger than water fractional flow and this streamline is gas-sourced.

In Block 603, using the reservoir model state, fluid front time of flights along the streamlines are determined. The evaluations of fractional flow values along traced streamlines are traversed to identify the front location for the streamlines. For water-sourced streamlines, the water front location is identified, while for gas-sourced streamlines, the gas front location is identified. The thresholding value of the fractional flow value to identify the front location is the input value in the schema as the maximum water cut/gas cut for the well.

In Block 605, using the reservoir model state, streamlines are connected to one or more wells. The traced streamlines are connected to the well completion grids and associated completion devices by matching the completion grid block indices (I, J, K) and the streamline source point grid block indices (I,J, K). Further, in one or more embodiments, the data structure is defined to store the connected streamline front TOF value and the sink point streamline rate value to the associated completion devices for the following analysis.

In Block 607, for multiple levels of granularity, streamlines are grouped into groups of streamlines to create a grouping hierarchy. Bundles of streamlines connected to the well completion grids are regrouped into the collections of completion grid cells as a group for completion grid for the analysis.

Figure 8:
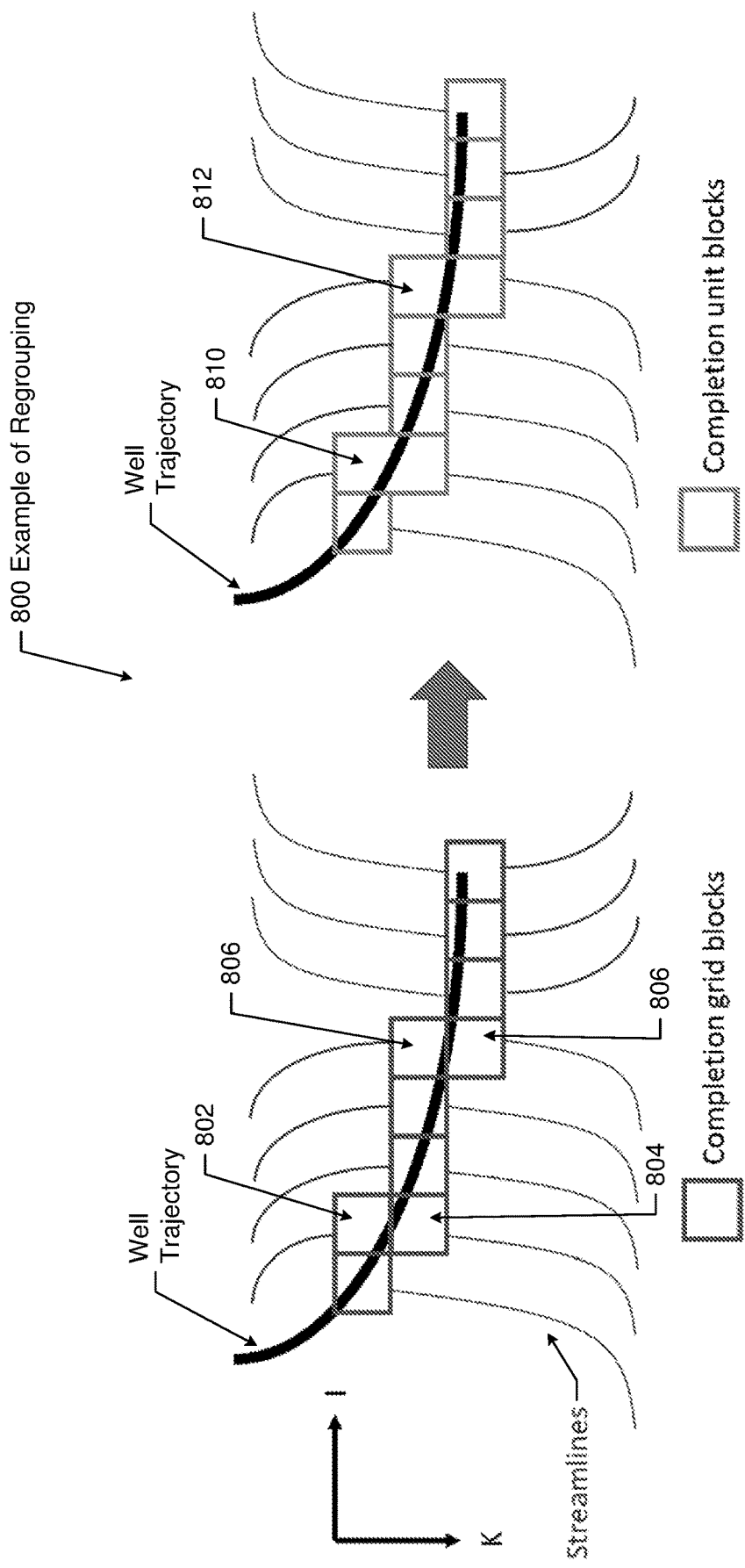
FIG. 8 shows an example in accordance with one or more embodiments.

Further, in one or more embodiments, the adjacent well completion grids are combined into one unit completion grid when the adjacent completion blocks indices (I1, J1, K1) and (I2, J2, K2) which only differ in the K direction (i.e. I1=I2, J1=J2, K1≠k2). An example of regrouping (800) is presented in FIG. 8. As shown in FIG. 8, grid cells (802, 804) and grid cells (806, 808) are grouped into group (810) and group (812), respectively. In one or more embodiments, the reason for the regrouping is to avoid large front time of flight evaluations for overriding streamlines connected to the well completion and to stabilize statistical calculations to filter the front time of flight values for the following analysis.

Returning to FIG. 6, in Block 609, the fluid front time of flights are filtered and computed based on the sources of the streamlines. For each completion unit blocks, (i) the connected bundle of streamlines and (ii) the pairs of the front time of flight values and the completion point flow rate values are stored. Based on the distribution of the fluid front time of flights, the streamlines are sorted from small to large fluid front time of flights. The ordered fluid front time of flight values are filtered as described above with reference to FIG. 4. In one or more embodiments, the filtering is performed by cumulative rate values by a specified percentile statistically to compute the fast front time of flight for the completion unit block. The default thresholding value is 2% of the total cumulative rate of the bundle of streamlines connected to the completion unit block.

After the completion unit percentile filtered fluid front time of flights are computed, the distribution of percentile filtered fluid front time of flights of completion unit blocks connecting to a completion device in the same filtering process is filtered by sorting the percentile filtered front time of flights from small to large among the completion unit blocks and filtering by the cumulative device rate percentile value.

Figure 9:
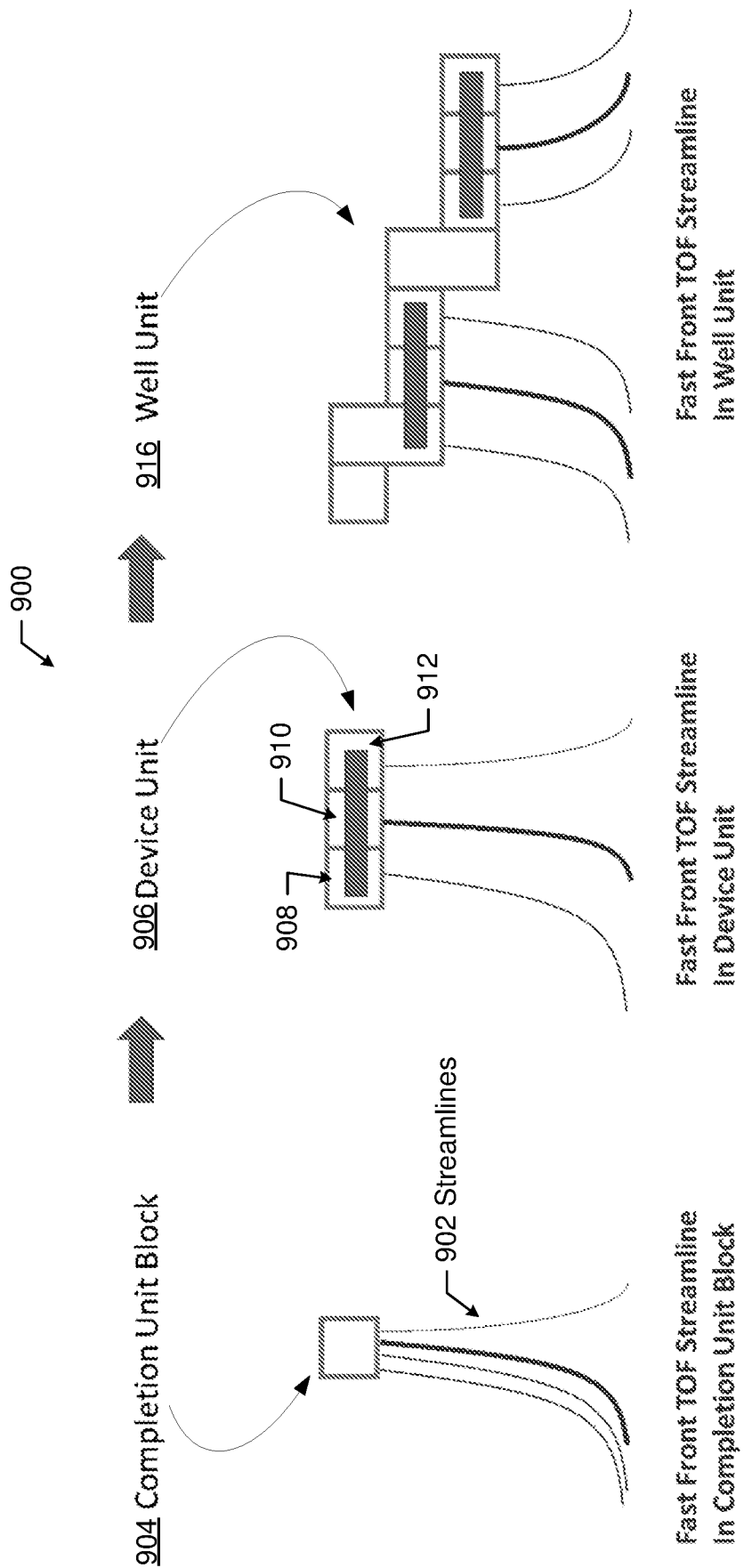
FIG. 9 shows an example in accordance with one or more embodiments.

After the device percentile filtered fluid front time of flights are computed, the streamlines are sorted into leading edge streamlines, which store smaller fluid front time of flight values than the device percentile filtered fluid front time of flight values, and the trailing edge streamlines, which store larger front fluid front time of flight values than the device percentile filtered fluid front time of flight values. Filtering and sorting process is depicted conceptually in example (900) shown in FIG. 9. As shown in FIG. 9, a completion unit block corresponding to a grid cell of the reservoir model, which may or may not have had regrouping performed, has multiple streamlines (902). Of the multiple streamlines, in the completion unit block stage (904), the fasted fluid front time of flights is selected. The fasted fluid front time of flight from the completion unit block stage (906) is used for the completion block to use at the device unit stage (906). Multiple completion units (e.g., completion unit (908), completion unit (910), completion unit (912)) having a parent group of a completion device (914). Each completion unit has a corresponding fastest fluid front time of flight at the completion device stage (906). The fastest fluid front time of flight at the completion unit device stages (906) is used for the well unit device stage (916). Specifically, each completion unit device has a corresponding fastest fluid front time of flight for the completion device that is used for determining the fastest fluid front time of flight for the parent group corresponding to the well unit.

Returning to FIG. 6, in Block 611, completion device target rates are computed. For a well, open device percentile filtered fluid front time of flights are checked and if fluid front time of flight is zero, then the fluid front is at the well and the well is set as a front breakthrough well.

For each open completion device, the device average leading edge fluid front time of flight is checked. The open completion device average trailing edge fluid front time of flight is computed based on the connected streamline sorting results from previous Block.

If the well is not set as a break thorough well, the uniform fluid front time of flight is computed from the leading edge average completion device fluid front time of flight and associated device total reservoir flow rates. The completion device target rate is computed using the ratio between the device average leading edge fluid front time of flight to the uniform fluid front time of flight.

If the well is set as a breakthrough well, the well open devices are separated into the group of completion devices with the front breakthrough and the group of completion devices without front break through. For the group of completion devices with the front breakthrough, the device oil cut (i.e., the ratio of oil flow rate to the total device flow rate) is determined and the uniform oil cut for the group of the devices with front break through is computed. The completion device target rate is computed using the ratio between the current device oil cut value to the uniform oil cut value.

For the group of completion devices without front breakthrough, the device target rate is computed the same as the well that is not set as front breakthrough well.

In one or more embodiments, a determination is made whether any completion device has front breakthrough. If not, fluid front time of flight equalization is performed in one or more embodiments. If two or more than two completion devices do not have fluid front time of flight breakthrough, then oil cut equalization may be performed for the devices. If less than two completion devices do not have fluid front time of flight breakthrough, then fluid front time of flight equalization may be performed for the non-breakthrough completion devices. If the front breakthrough completion devices are two or more, then oil cut equalization may be performed on the front breakthrough completion devices. Performing the equalization may be as described below with reference to the equations.

In Block 613, the completion device target rates are compared with device constraints to confirm that the completion device target constrains comply. A determination is made whether the computed target rates violate the device setting constraints. The target rate values are adjusted when the device setting constraints are violated. Currently, the maximum and minimum device rate values and/or the maximum device pressure drop value may be imposed for each device for the optimization. Here, the target device rate with the specified device constraints may be iteratively adjusted in the input schema since the relationship of the target device rate and the device front time of flight values and/or the relationship of the target device and the device oil cut values are nonlinear. If the adjustment did not meet constraint limits after the maximum 10 iterations, the code outputs the warning messages of violation of the constraint limits.

FIGS. 7.1-7.7 show conceptual diagrams in accordance with one or more embodiments. Embodiments are not limited to the conceptual diagrams shown. Rather, the diagrams are for explanatory purposes. FIG. 7.1 shows an example conceptual diagram (700) of an injection well (702) and a production well (704). As shown by changing greyscale gradient and line on the right the formation permeability may decrease with an increase in depth. As denoted by key (706), the injection well injects water and the production well is to produce oil. Further, the injection well and production well have multiple completion devices, such as flow control devices, to manage flow in and out of the reservoir.

Turning to FIG. 7.2, FIG. 7.2 shows the example diagram (710) of FIG. 7.1 with showing locations of water and oil fluids. In FIG. 7.2, the injection and production total flow rates for the completion devices are fixed to have the same size opening regardless of permeability. Thus, the horizontal location of fluid front (e.g., fluid front (712)) varies with permeability. In other words, due to the formation permeability contrast, injected water displaces oil unevenly.

FIG. 7.3 continues the example of FIGS. 7.1 and 7.2. In the diagram (716) of FIG. 7.3, the injection rate is fixed, and the production rate is controlled by changing the valve openings of the completion devices. The relative size of the valve openings is shown in key (718). Accordingly, the fluid front is equalized. Further, as shown in the diagram (720) of FIG. 7.4, the valve openings of the completion devices on the injection well may vary to equalize the fluid front. Specifically, diagram (720) of FIG. 7.4 continues the example of FIGS. 7.1. 7.2, and 7.3 with the same key.

FIG. 7.5 continues the example and shows streamlines (e.g., streamline (722)) between the injection well and the production well. In the diagram (724) of FIG. 7.5, the same rates are assigned to the flow control devices similar to FIG. 7.2.

FIGS. 7.6 and 7.7 extend the example of FIGS. 7.1, 7.2, 7.3, and 7.4. FIG. 7.6 shows a conceptual diagram (730) showing streamlines and fluid front time of flight for production control. As shown by $\tau_1$, $\tau_2$, and $\tau_3$, the fluid front time of flight for production control may be from the water front to production device completion points.

FIG. 7.7 shows a conceptual diagram (740) showing streamlines and fluid front time of flight for injection control in some embodiments. As shown by $\tau_4$, $\tau_5$, and $\tau_6$, the fluid front time of flight for injection control may be from injection completion points to the water front. In some embodiments, injection control may use the fluid front time of flight as shown in FIG. 7.6.

The following is an example for allocating rates to groups in one or more embodiments. With respect to an interval i, a group of streamlines may be sorted into the leading edge streamlines with early fluid front breakthrough time and the remaining streamlines with average rates and average time of flight values as $q_i'$, $q_i''$, $\tau_i'$, $\tau_i''$ respectively. The values, $q_i'$, $q_i''$, $\tau_i'$, $\tau_i''$, may be calculated using each streamline associated rate and time of flight using following equations Eq. 1-4.

$$q_i' = \sum_{k=1}^{N_{st,i}'} q_{st,k}' \qquad \text{(Eq. 1)}$$

$$q_i'' = \sum_{k=1}^{N_{st,i}''} q_{st,k}'' \qquad \text{(Eq. 2)}$$

$$\tau'_i = \frac{\sum_{k=1}^{N'_{st,i}} \tau'_{st,k} q'_{st,k}}{\sum_{k=1}^{N'_{st,i}} q'_{st,k}} \qquad (\text{Eq. 3})$$

$$\tau''_i = \frac{\sum_{k=1}^{N''_{st,i}} \tau''_{st,k} q''_{st,k}}{\sum_{k=1}^{N''_{st,i}} q''_{st,k}} \qquad (\text{Eq. 4})$$

In Equations, Eq. 1-4, $N_{st}'$ is the number of the leading edge streamline with early breakthrough time and $N_{st}''$ is the number of the rest of the streamline in the bundle connecting to the interval i.

If wellbore intervals are differentially choked, part of an individual interval or a whole interval could reverse the respective flow direction (crossflow). Crossflow occurs when wellbore annulus pressure exceeds reservoir pressure in a grid block right next to that particular annulus node. Onset of crossflow renders that grid cell unable to become a sink point for any streamlines. Streamlines that still enter that cell end up passing through to the neighboring grid cells. The negative flow through the connection of this grid cell to the wellbore is therefore unaccounted for by any of the streamlines and has to be inferred from the connection itself. A sum of this negative flows is then to be added to $q_i''$ at the trailing edge to correctly represent the total interval production.

A flat distribution of the leading edge streamline average time of flight across the well intervals is optimal. However, the flow regulation control point for ICD may be one point per one interval. Thus, regulating the leading edge streamline time of flight will adjust the rest of the streamline bundle in a proportional relationship as defined in equation, Eq. 5.

$$\frac{Q'_i}{q'_i} = \frac{Q''_i}{q''_i} \qquad (\text{Eq. 5})$$

In Eq. 38, $Q_i'$ and $Q_i''$ are the new rates after regulating the flow in order to make the flat distribution of the leading edge streamline average time of flight across the well intervals. The relationship between pore volume and the rate and time of flight along a streamline trajectory may be calculated using equation, Eq. 6.

$$V(s) = \int \tau(s) q(s) ds \qquad (\text{Eq. 6})$$

Each bundle of streamline volumes maintains before and after the regulation as $$Q_i' T' = q_i' \tau_i' \qquad (\text{Eq. 7})$$

$$Q_i'' T_i'' = q_i'' \tau_i'' \qquad (\text{Eq. 8})$$

In Eq. 7 and Eq. 8, the rate is assumed constant along the streamline and T is the flat leading edge streamline average time of flight across the well intervals and $T_i''$ is the new average time of flight for the rest of the streamline bundle.

The total well rate $Q_T$ should be balanced before and after the flow regulation according to equation, Eq. 9.

$$Q_T = \sum_{i=1}^{N_T} (q'_i + q''_i) = \sum_{i=1}^{N_T} (Q'_i + Q''_i) \qquad (\text{Eq. 9})$$

where $N_T$ is the total number of the intervals for the well.

From above equation (9), both sides of equations may be multiplied by the leading edge flat average streamline time of flight, T', using equation, Eq. 10.

$$T' \sum_{i=1}^{N_T} (q'_i + q''_i) = T' \sum_{i=1}^{N_T} (Q'_i + Q''_i) \qquad (\therefore \text{equation}(5))$$

$$\Leftrightarrow T' \sum_{i=1}^{N_T} (q'_i + q''_i) = \sum_{i=1}^{N_T} (T'Q'_i + T'Q''_i)$$

$$\Leftrightarrow T' \sum_{i=1}^{N_T} (q'_i + q''_i) =$$

$$\sum_{i=1}^{N_T} \left( T'Q'_i + \frac{q''_i}{q'_i} T'Q'_i \right) = \sum_{i=1}^{N_T} \left( \left(1 + \frac{q''_i}{q'_i}\right) T'Q'_i \right)$$

$$\Leftrightarrow T' \sum_{i=1}^{N_T} (q'_i + q''_i) = \qquad (\therefore \text{equation}(7))$$

$$\sum_{i=1}^{N_T} \left( \left(1 + \frac{q''_i}{q'_i}\right) q'_i \tau'_i \right) = \sum_{i=1}^{N_T} ((q'_i + q''_i) \tau'_i)$$

$$\Leftrightarrow T' = \frac{\sum_{i=1}^{N_T} ((q'_i + q''_i) \tau'_i)}{\sum_{i=1}^{N_T} (q'_i + q''_i)} \qquad (\text{Eq. 11})$$

Using Eq. 11, T' is simply the interval rate weighted interval average of leading edge average time of flight. And the regulated new rate for interval, $Q_i^{new}$, is obtained, using equations Eq. 5 and Eq. 7, as equation Eq. 12.

$$Q_i^{new} = Q'_i + Q''_i = \qquad (\text{Eq. 12})$$

$$\left(1 + \frac{q''_i}{q'_i}\right) Q'_i = \frac{\left(1 + \frac{q''_i}{q'_i}\right) q'_i \tau'_i}{T'} = \frac{(q'_i + q''_i) \tau'_i}{T'} = q_i^{old} \frac{\tau'_i}{T'}$$

As shown by equation Eq. 12, the new interval rate is calculated by the current interval rate, $q_i^{old}$ with the ratio of current average time of flight of the leading edge streamlines, $\tau_i'$, to the leading edge flat average streamline time of flight, T', from equation Eq. 11.

Embodiments may be implemented on a computing system. Any combination of mobile, desktop, server, router, switch, embedded device, or other types of hardware may be used. For example, as shown in FIG. 10.1, the computing system (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive or digital versatile disk (DVD) drive, a flash memory, etc.), a communication interface (1012) (e.g., Bluetooth interface, infrared interface, network interface, optical interface, etc.), and numerous other elements and functionalities.

The computer processor(s) (1002) may be an integrated circuit for processing instructions. For example, the computer processor(s) may be one or more cores or micro-cores of a processor. The computing system (1000) may also include one or more input devices (1010), such as a touchscreen, keyboard, mouse, microphone, touchpad, electronic pen, or any other type of input device.

The communication interface (1012) may include an integrated circuit for connecting the computing system (1000) to a network (not shown) (e.g., a local area network (LAN), a wide area network (WAN) such as the Internet, mobile network, or any other type of network) and/or to another device, such as another computing device.

Further, the computing system (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The computing system (1000) in FIG. 10.1 may be connected to or be a part of a network. For example, as shown in FIG. 10.2, the network (1020) may include multiple nodes (e.g., node X (1022), node Y (1024)). Each node may correspond to a computing system, such as the computing system shown in FIG. 10.1, or a group of nodes combined may correspond to the computing system shown in FIG. 10.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1000) may be located at a remote location and connected to the other elements over a network.

Although not shown in FIG. 10.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1022), node Y (1024)) in the network (1020) may be configured to provide services for a client device (1026). For example, the nodes may be part of a cloud computing system. The nodes may include functionality to receive requests from the client device (1026) and transmit responses to the client device (1026). The client device (1026) may be a computing system, such as the computing system shown in FIG. 10.1. Further, the client device (1026) may include and/or perform at least a portion of one or more embodiments.

The computing system or group of computing systems described in FIG. 10.1 and FIG. 10.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 10.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 10.1, while performing one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B involves comparing the first element of vector A with the first element of vector B, the second element of vector A with the second element of vector B, etc. In one or more embodiments, if A and B are strings, the binary values of the strings may be compared.

The computing system in FIG. 10.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 10.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 10.1 and the nodes and/or client device in FIG. 10.2. Other functions may be performed using one or more embodiments.

While one or more embodiments have been described with respect to a limited number of embodiments, those skilled in the art, having benefit of this disclosure, will appreciate that other embodiments may be devised which do not depart from the scope as disclosed herein. Accordingly, the scope should be limited by the attached claims.

What is claimed is:

1. A method of controlling a multiple wellbore system, including at least one injection wellbore and at least one production wellbore, to stimulate a reservoir, the method comprising:
   obtaining, using a reservoir simulator, a first reservoir model state;
   tracing a plurality of streamlines through the first reservoir model state to obtain a plurality of streamline trajectories of a fluid flow through at least part of the reservoir;
   detecting, using the first reservoir model state, a plurality of fluid fronts along the plurality of streamlines;
   connecting, using the plurality of streamline trajectories, the plurality of streamlines to the at least one injection wellbore and the at least one production wellbore;
   grouping, for a plurality of granularity levels, the plurality of streamlines into a plurality of groups to obtain a grouping hierarchy;
   determining, through the plurality of granularity levels of the grouping hierarchy, a plurality of fluid front time of flights for the plurality of groups;
   based on the plurality of fluid front time of flights, determining a plurality of target flowrates for a plurality of flow control devices of the at least one injection wellbore and the at least one production wellbore, the plurality of target flowrates being determined to regulate a fluid front arrival time of the fluid flow across the reservoir;
   generating a completion design for the multiple wellbore system including determining choke parameters for controlling downhole flowrates of the plurality of flow control devices to achieve the plurality of target flowrates;
   providing the choke parameters to the plurality of flow control devices via a field operation control signal; and
   based on the field operation control signal, adjusting the downhole flowrates of the plurality of flow control devices in accordance with the choke parameters to the plurality of target flowrates in order to regulate the fluid front arrival time of the fluid flow across the reservoir.

2. The method of claim 1, further comprising:
   obtaining, using the reservoir simulator, a second reservoir model state using the first reservoir model state and the plurality of target flowrates, the first reservoir model state for a first time period and the second reservoir model state for a second time period that is subsequent to the first time period;
   tracing the plurality of streamlines through the second reservoir model state to obtain an updated plurality of streamline trajectories;
   detecting, using the second reservoir model state, an updated plurality of fluid fronts along the updated plurality of streamline trajectories;
   connecting, using the updated plurality of streamline trajectories, the plurality of streamlines to the at least one injection wellbore and the at least one production wellbore;
   regrouping, for the plurality of granularity levels, the plurality of streamlines into an updated plurality of groups to obtain an updated grouping hierarchy;
   determining, through the plurality of granularity levels of the updated grouping hierarchy, an updated plurality of fluid front time of flights for the plurality of groups;
   based on the updated plurality of fluid front time of flights, determining an updated plurality of target flowrates for the plurality of flow control devices to regulate the fluid front arrival time of the fluid flow across the reservoir for the second reservoir model state,
   generating an updated completion design including determining updated choke parameters for the plurality of flow control devices to achieve the updated plurality of target flowrates;
   providing the updated choke parameters to the plurality of flow control devices via a second field operation control signal; and
   based on the second field operation control signal, adjusting the downhole flowrates of the plurality of flow control devices in accordance with the updated choke parameters to the updated plurality of target flowrates.

3. The method of claim 1, further comprising:
   sorting, using the first reservoir model state, the plurality of streamlines by fluid source, wherein the plurality of fluid front time of flights is dependent on the fluid source.

4. The method of claim 3, further comprising:
   determining a fluid front time of flight for individual streamlines of the plurality of streamlines based on the fluid source,
   wherein grouping the plurality of streamlines into the plurality of groups is further based on the fluid front time of the flight of individual streamlines.

5. The method of claim 4, wherein grouping the plurality of streamlines into the plurality of groups comprises the bundling of individual streamlines into a streamline bundle based on the individual streamlines being within a threshold degree of variability of the fluid front time of flight of the individual streamlines and being consecutive.

6. The method of claim 1, further comprising:
grouping at least two streamlines of the plurality of streamlines into a first group of the plurality of groups based at least on a terminating location of the at least two streamlines being at a same grid cell in a reservoir model, the first group being in a first granularity level of the plurality of granularity levels.

7. The method of claim 6, further comprising:
grouping at least the first group and a second group of the plurality of groups into a third group of the plurality of groups based at least on a terminating location of the first group and the second group being at a same flow control device in the reservoir model, the third group being in a second granularity level of the plurality of granularity levels.

8. The method of claim 1, further comprising:
determining a leading edge fluid front time of flight and a trailing edge fluid front time of flight of the plurality of fluid front time of flights for at least a subset of the plurality of groups of the grouping hierarchy; and
calculating, using the leading edge fluid front time of flight and the trailing edge fluid front time of flight, a uniform time of flight for each of the at least the subset of the plurality of groups of the grouping hierarchy,
wherein determining the plurality of target flowrates is to achieve the uniform time of flight.

9. The method of claim 1, further comprising:
connecting at least a subset of the plurality of streamlines to the at least one injection wellbore, wherein at least a subset of the plurality of target flowrates are assigned to at least one flow control device on the at least one injection wellbore.

10. The method of claim 1, wherein at least one fluid front time of flight of the plurality of fluid front time of flights is from the at least one injection wellbore to a completion point in a subsurface formation.

11. The method of claim 1, further comprising:
adjusting the plurality of target flowrates when a plurality of device setting constraints are violated by the plurality of target flowrates, wherein the plurality of device setting constraints are constraints of the plurality of flow control devices.

12. A system comprising:
a computer processor;
memory; and
instructions stored in the memory and executable by the computer processor to cause the computer processor to perform operations, the operations comprising:
obtaining, using a reservoir simulator, a first reservoir model state;
tracing a plurality of streamlines through the first reservoir model state to obtain a plurality of streamline trajectories of a fluid flow through at least a part of a reservoir;
detecting, using the first reservoir model state, a plurality of fluid fronts along the plurality of streamlines;
connecting, using the plurality of streamline trajectories, the plurality of streamlines to at least one injection wellbore and at least one production wellbore of a multiple wellbore system for stimulating the reservoir;
grouping, for a plurality of granularity levels, the plurality of streamlines into a plurality of groups to obtain a grouping hierarchy;
determining, through the plurality of granularity levels of the grouping hierarchy, a plurality of fluid front time of flights for the plurality of groups;
based on the plurality of fluid front time of flights, determining a plurality of target flowrates for a plurality of flow control devices of the at least one injection wellbore and the at least one production wellbore, the plurality of target flowrates being determined to regulate a fluid front arrival time of the fluid flow across the reservoir;
generating a completion design for the multiple wellbore system including determining choke parameters for controlling downhole flowrates of the plurality of flow control devices to achieve the plurality of target flowrates;
providing the choke parameters to the plurality of flow control devices via a field operation control signal; and
based on the field operation control signal, adjusting the downhole flowrates of the plurality of flow control devices in accordance with the choke parameters to the plurality of target flowrates in order to regulate the fluid front arrival time of the fluid flow across the reservoir.

13. The system of claim 12, wherein the operations further comprises:
grouping at least two streamlines of the plurality of streamlines into a first group of the plurality of groups based at least on a terminating location of the at least two streamlines being at a same grid cell in the first reservoir model state, the first group being in a first granularity level of the plurality of granularity levels; and
grouping at least the first group and a second group of the plurality of groups into a third group of the plurality of groups based at least on a terminating location of the first group and the second group being at a same completion device in the first reservoir model state, the third group being in a second granularity level of the plurality of granularity levels.

14. The system of claim 13, wherein the operations further comprises:
determining a leading edge fluid front time of flight and a trailing edge fluid front time of flight of the plurality of fluid front time of flights for at least a subset of the plurality of groups of the grouping hierarchy; and
calculating, using the leading edge fluid front time of flight and the trailing edge fluid front time of flight, a uniform time of flight for each of the at least the subset of the plurality of groups of the grouping hierarchy,
wherein determining the plurality of target flowrates is to achieve the uniform time of flight.

15. A non-transitory computer readable medium comprising instructions that, when executed by a computer processor of a computing system, cause the computing system to perform operations, the operations comprising:
obtaining, using a reservoir simulator, a first reservoir model state;
tracing a plurality of streamlines through the first reservoir model state to obtain a plurality of streamline trajectories of a fluid flow through at least part of a reservoir;
detecting, using the first reservoir model state, a plurality of fluid fronts along the plurality of streamlines;
connecting, using the plurality of streamline trajectories, the plurality of streamlines to at least one injection wellbore and at least one production wellbore of a multiple wellbore system indicated in the first reservoir model state;

grouping, for a plurality of granularity levels, the plurality of streamlines into a plurality of groups to obtain a grouping hierarchy;

determining, through the plurality of granularity levels of the grouping hierarchy, a plurality of fluid front time of flights for the plurality of groups;

based on the plurality of fluid front time of flights, determining a plurality of target flowrates for a plurality of flow control devices of the at least one injection wellbore and the at least one production wellbore, the plurality of target flowrates being determined to regulate a fluid front arrival time of the fluid flow across the reservoir;

generating a completion design for the multiple wellbore system including determining choke parameters for controlling downhole flowrates of the plurality of flow control devices to achieve the plurality of target flowrates;

providing the choke parameters to the plurality of flow control devices via a field operation control signal; and based on the field operation control signal, adjusting the downhole flowrates of the plurality of flow control devices in accordance with the choke parameters to the plurality of target flowrates in order to regulate the fluid front arrival time of the fluid flow across the reservoir.

16. The method of claim 1, wherein regulating the fluid front arrival time of the fluid flow across the reservoir includes achieving a uniform fluid front arrival time of the fluid flow at the at least one production wellbore.

17. The method of claim 16, wherein adjusting the downhole flowrates of the plurality of flow control devices includes:

adjusting a first downhole flowrate of a first flow control device of the plurality of flow control devices to a first target flowrate of the plurality of target flowrates; and adjusting a second downhole flowrate of a second flow control device of the plurality of flow control devices to a second target flowrate of the plurality of target flowrates, wherein the first target flowrate and the second target flowrate are different and wherein the first flow control device and the second flow control device are positioned within a same wellbore of the multiple wellbore system.

18. The method of claim 17, wherein the first target flowrate is associated with a fluid flow of a first portion of the reservoir having a first permeability and the second target flowrate is associated with a fluid flow of a second portion of the reservoir having a second permeability, and wherein the uniform fluid front arrival time of the fluid flow is uniform based on being substantially uniform across the first portion of the reservoir and the second portion of the reservoir.

19. The method of claim 1, wherein the completion design includes choke parameters for at least one flow control device of the at least one injection wellbore and for at least one flow control device of the at least one production wellbore.

20. The method of claim 1, wherein the plurality of flow control devices include one or more of an inline flow control device, an annular flow control device, an active flow control device, a passive flow control device, or an autonomous flow control device.

* * * * *